US008171404B2

(12) United States Patent  (10) Patent No.: US 8,171,404 B2
Borchers et al.  (45) Date of Patent: May 1, 2012

(54) METHODS AND SYSTEMS FOR DISASSEMBLY AND REASSEMBLY OF EXAMINATION DOCUMENTS

(75) Inventors: Gregory Eugene Borchers, Vancouver, WA (US); Rono James Mathieson, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 587 days.

(21) Appl. No.: 11/685,046

(22) Filed: Mar. 12, 2007

(65) Prior Publication Data

US 2007/0146823 A1  Jun. 28, 2007

Related U.S. Application Data

(63) Continuation-in-part of application No. 10/962,248, filed on Oct. 8, 2004, now Pat. No. 8,018,610, and a continuation-in-part of application No. 10/961,793, filed on Oct. 8, 2004, now Pat. No. 8,035,831, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004, now Pat. No. 7,969,596.

(51) Int. Cl.
*G06F 17/00* (2006.01)
(52) U.S. Cl. ......... 715/272; 715/255; 715/243; 715/234
(58) Field of Classification Search .................. 715/233
See application file for complete search history.

(56) References Cited

U.S. PATENT DOCUMENTS

| 5,085,587 | A | 2/1992 | DesForges et al. |
| 5,323,393 | A | 6/1994 | Barrett et al. |
| 5,365,494 | A | 11/1994 | Lynch |
| 5,504,589 | A | 4/1996 | Montague et al. |
| 5,513,112 | A | 4/1996 | Herring et al. |
| 5,659,845 | A | 8/1997 | Krist et al. |
| 5,671,412 | A | 9/1997 | Christiano |
| 5,699,493 | A | 12/1997 | Davidson et al. |
| 5,699,494 | A | 12/1997 | Colbert et al. |

(Continued)

FOREIGN PATENT DOCUMENTS

EP  1160657  12/2001

(Continued)

OTHER PUBLICATIONS

F.D. Wright, Design Goals for an Internet Printing Protocol, Apr. 1999, pp. 1-43, http://tools.ietf.org/html/rfc2567.

(Continued)

*Primary Examiner* — Doug Hutton, Jr.
*Assistant Examiner* — Benjamin Smith
(74) *Attorney, Agent, or Firm* — Kristine Elizabeth Matthews; David C. Ripma

(57) ABSTRACT

Aspects of the present invention relate to systems, methods and devices for manipulating documents. According to one aspect of the present invention, the responses, from multiple examinees, to a question on an examination may be combined to form a combined document associated with the question for grading, scoring or other analysis. According to a second aspect of the present invention, markings made by the examination grader, on the combined document, associated with an examinee may be combined with the examinee's examination document to produce a modified examination document.

20 Claims, 26 Drawing Sheets

U.S. PATENT DOCUMENTS

| | | |
|---|---|---|
| 5,717,439 A | 2/1998 | Levine et al. |
| 5,726,883 A | 3/1998 | Levine et al. |
| 5,727,082 A | 3/1998 | Sugishima |
| 5,727,135 A | 3/1998 | Webb et al. |
| 5,745,883 A | 4/1998 | Krist et al. |
| 5,760,775 A | 6/1998 | Sklut et al. |
| 5,774,678 A | 6/1998 | Motoyama |
| 5,791,790 A | 8/1998 | Bender et al. |
| 5,796,934 A | 8/1998 | Bhanot et al. |
| 5,799,206 A | 8/1998 | Kitagawa et al. |
| 5,799,289 A | 8/1998 | Fukushima et al. |
| 5,812,818 A | 9/1998 | Adler et al. |
| 5,832,264 A | 11/1998 | Hart et al. |
| 5,877,776 A | 3/1999 | Beaman et al. |
| 5,944,824 A | 8/1999 | He |
| 5,956,487 A | 9/1999 | Venkatraman et al. |
| 5,956,698 A | 9/1999 | Lacheze et al. |
| 5,968,127 A | 10/1999 | Kawabe et al. |
| 5,993,088 A | 11/1999 | Nogay et al. |
| 5,995,553 A | 11/1999 | Crandall et al. |
| 5,999,708 A | 12/1999 | Kajita |
| 6,042,384 A | 3/2000 | Loiacono |
| 6,069,706 A | 5/2000 | Kajita |
| 6,075,860 A | 6/2000 | Ketcham |
| 6,115,132 A | 9/2000 | Nakatsuma et al. |
| 6,118,546 A | 9/2000 | Sanchez |
| 6,128,731 A | 10/2000 | Zarrin et al. |
| 6,141,662 A | 10/2000 | Jeyachandran |
| 6,148,346 A | 11/2000 | Hanson |
| 6,161,139 A | 12/2000 | Win et al. |
| 6,178,308 B1 | 1/2001 | Bobrow et al. |
| 6,199,080 B1 | 3/2001 | Nielsen |
| 6,213,652 B1 | 4/2001 | Suzuki et al. |
| 6,216,113 B1 | 4/2001 | Aikens et al. |
| 6,233,409 B1 | 5/2001 | Haines et al. |
| 6,240,456 B1 | 5/2001 | Teng et al. |
| 6,246,487 B1 | 6/2001 | Kobayashi et al. |
| 6,292,267 B1 | 9/2001 | Mori et al. |
| 6,301,016 B1 | 10/2001 | Matsueda et al. |
| 6,307,640 B1 | 10/2001 | Motegi |
| 6,311,040 B1 | 10/2001 | Kucinski et al. |
| 6,353,878 B1 | 3/2002 | Dunham |
| 6,369,905 B1 | 4/2002 | Mitsuhashi et al. |
| 6,426,798 B1 | 7/2002 | Yeung |
| 6,433,883 B1 | 8/2002 | Kajita |
| 6,438,589 B1 | 8/2002 | Iwata |
| 6,476,926 B1 | 11/2002 | Yano et al. |
| 6,490,601 B1 | 12/2002 | Markus et al. |
| 6,510,466 B1 | 1/2003 | Cox et al. |
| 6,516,157 B1 | 2/2003 | Maruta et al. |
| 6,526,258 B2 | 2/2003 | Bejar et al. |
| 6,567,179 B1 | 5/2003 | Sato et al. |
| 6,590,673 B2 | 7/2003 | Kadowaki |
| 6,597,469 B1 | 7/2003 | Kuroyanagi |
| 6,604,157 B1 | 8/2003 | Brusky et al. |
| 6,621,422 B2 | 9/2003 | Rubenstein |
| 6,636,929 B1 | 10/2003 | Frantz et al. |
| 6,643,650 B1 | 11/2003 | Slaughter et al. |
| 6,652,169 B2 | 11/2003 | Parry |
| 6,685,637 B1 | 2/2004 | Rom |
| 6,690,913 B2 * | 2/2004 | Makishima et al. .......... 434/350 |
| 6,721,286 B1 | 4/2004 | Williams et al. |
| 6,735,773 B1 | 5/2004 | Trinh et al. |
| 6,749,434 B2 | 6/2004 | Stuppy |
| 6,772,945 B2 | 8/2004 | Mahoney et al. |
| 6,775,729 B1 | 8/2004 | Matsuo et al. |
| 6,826,727 B1 | 11/2004 | Mohr et al. |
| 6,836,845 B1 | 12/2004 | Lennie et al. |
| 6,850,252 B1 | 2/2005 | Hoffberg |
| 6,862,110 B2 | 3/2005 | Harrington |
| 6,873,429 B2 | 3/2005 | Matsuura |
| 6,874,010 B1 | 3/2005 | Sargent |
| 6,904,412 B1 | 6/2005 | Broadbent et al. |
| 6,915,525 B2 | 7/2005 | Ozawa |
| 6,934,706 B1 | 8/2005 | Mancuso et al. |
| 6,934,740 B1 | 8/2005 | Lawande et al. |
| 6,940,532 B1 | 9/2005 | Fukui et al. |
| 6,948,175 B1 | 9/2005 | Fong et al. |
| 6,951,303 B2 | 10/2005 | Petersen et al. |
| 6,975,820 B2 | 12/2005 | Wong |
| 6,999,987 B1 | 2/2006 | Billingsley et al. |
| 7,013,289 B2 | 3/2006 | Horn et al. |
| 7,019,753 B2 | 3/2006 | Rappaport et al. |
| 7,043,687 B2 * | 5/2006 | Knauss et al. ................ 715/236 |
| 7,079,143 B2 | 7/2006 | Gilbert |
| 7,095,513 B2 | 8/2006 | Stringham |
| 7,107,615 B2 | 9/2006 | Cossel et al. |
| 7,124,097 B2 | 10/2006 | Claremont et al. |
| 7,127,700 B2 | 10/2006 | Large |
| 7,136,909 B2 | 11/2006 | Balasuriya |
| 7,136,941 B2 | 11/2006 | Nguyen et al. |
| 7,143,364 B1 | 11/2006 | Tam |
| 7,145,673 B1 | 12/2006 | Lin |
| 7,149,697 B2 | 12/2006 | Zerza et al. |
| 7,162,103 B2 | 1/2007 | Meunier et al. |
| 7,170,618 B2 | 1/2007 | Fujitani et al. |
| 7,171,615 B2 * | 1/2007 | Jensen et al. ................... 715/222 |
| 7,174,056 B2 | 2/2007 | Silverbrook et al. |
| 7,177,814 B2 | 2/2007 | Gong et al. |
| 7,181,017 B1 | 2/2007 | Nagel et al. |
| 7,181,442 B2 | 2/2007 | Yeh et al. |
| 7,185,078 B2 | 2/2007 | Pleyer et al. |
| 7,188,125 B1 | 3/2007 | Karr |
| 7,188,181 B1 | 3/2007 | Squier et al. |
| 7,197,615 B2 | 3/2007 | Arakawa et al. |
| 7,203,699 B2 * | 4/2007 | Bellamy ............................. 1/1 |
| 7,212,301 B2 * | 5/2007 | Treibach-Heck et al. ... 358/1.15 |
| 7,216,347 B1 | 5/2007 | Harrison et al. |
| 7,233,929 B1 | 6/2007 | Lingle et al. |
| 7,239,409 B2 | 7/2007 | Parry |
| 7,240,279 B1 * | 7/2007 | Chartier et al. ................ 715/210 |
| RE39,808 E | 9/2007 | Motegi |
| 7,272,269 B2 | 9/2007 | Tojo et al. |
| 7,275,044 B2 | 9/2007 | Chauvin et al. |
| 7,284,061 B2 | 10/2007 | Matsubayashi et al. |
| 7,293,034 B2 | 11/2007 | Paya et al. |
| 7,296,221 B1 * | 11/2007 | Treibach-Heck et al. ..... 715/224 |
| 7,301,658 B2 | 11/2007 | Henry |
| 7,305,616 B1 | 12/2007 | Nelson et al. |
| 7,321,440 B2 | 1/2008 | Kimura |
| 7,325,196 B1 | 1/2008 | Covington et al. |
| 7,327,478 B2 | 2/2008 | Matsuda |
| 7,328,245 B1 | 2/2008 | Hull et al. |
| 7,349,949 B1 | 3/2008 | Connor et al. |
| 7,363,586 B1 | 4/2008 | Briggs et al. |
| 7,404,204 B2 | 7/2008 | Davenport et al. |
| 7,406,660 B1 | 7/2008 | Sikchi et al. |
| 7,444,519 B2 | 10/2008 | Laferriere et al. |
| 7,451,392 B1 | 11/2008 | Chalecki et al. |
| 7,454,623 B2 | 11/2008 | Hardt |
| 7,496,837 B1 | 2/2009 | Larcheveque et al. |
| 7,500,178 B1 | 3/2009 | O'Donnell |
| 7,508,535 B2 | 3/2009 | Hart et al. |
| 7,509,649 B2 | 3/2009 | Shenfield |
| 7,545,528 B2 | 6/2009 | Takabayashi et al. |
| 7,548,334 B2 | 6/2009 | Lo et al. |
| 7,552,265 B2 | 6/2009 | Newman et al. |
| 7,565,554 B2 | 7/2009 | Joosten et al. |
| 7,567,360 B2 | 7/2009 | Takahashi et al. |
| 7,573,593 B2 | 8/2009 | Hart et al. |
| 7,729,363 B2 | 6/2010 | Shenfield et al. |
| 2001/0021945 A1 | 9/2001 | Matsuura |
| 2001/0027527 A1 | 10/2001 | Khidekel et al. |
| 2001/0028808 A1 | 10/2001 | Nomura et al. |
| 2001/0038462 A1 | 11/2001 | Teeuwen et al. |
| 2001/0039614 A1 | 11/2001 | Hellberg et al. |
| 2001/0044787 A1 | 11/2001 | Shwartz et al. |
| 2002/0016921 A1 | 2/2002 | Olsen et al. |
| 2002/0029256 A1 | 3/2002 | Zintel et al. |
| 2002/0032745 A1 | 3/2002 | Honda |
| 2002/0049786 A1 | 4/2002 | Bibliowicz et al. |
| 2002/0052916 A1 | 5/2002 | Kloba et al. |
| 2002/0055984 A1 | 5/2002 | Chang et al. |
| 2002/0059265 A1 | 5/2002 | Valorose, III |
| 2002/0073148 A1 | 6/2002 | Haines et al. |
| 2002/0080381 A1 | 6/2002 | Haines |
| 2002/0083099 A1 * | 6/2002 | Knauss et al. ................ 707/513 |

| | | |
|---|---|---|
| 2002/0089691 A1 | 7/2002 | Fertlitsch et al. |
| 2002/0093676 A1 | 7/2002 | Parry |
| 2002/0098027 A1 | 7/2002 | Koike et al. |
| 2002/0099796 A1 | 7/2002 | Chou |
| 2002/0103827 A1 | 8/2002 | Sesek |
| 2002/0105664 A1 | 8/2002 | Inoue et al. |
| 2002/0107885 A1* | 8/2002 | Brooks et al. ............... 707/505 |
| 2002/0107939 A1 | 8/2002 | Ford et al. |
| 2002/0109718 A1 | 8/2002 | Mansour et al. |
| 2002/0112037 A1 | 8/2002 | Koss |
| 2002/0120792 A1 | 8/2002 | Blair |
| 2002/0138279 A1 | 9/2002 | Al-Kazily et al. |
| 2002/0138476 A1 | 9/2002 | Suwa et al. |
| 2002/0138666 A1 | 9/2002 | Fujisawa |
| 2002/0145627 A1 | 10/2002 | Whitmarsh |
| 2002/0147858 A1 | 10/2002 | Motoyama et al. |
| 2002/0152183 A1 | 10/2002 | Soares et al. |
| 2002/0152235 A1 | 10/2002 | Motoyama et al. |
| 2002/0152244 A1* | 10/2002 | Dean et al. ............... 707/530 |
| 2002/0152302 A1 | 10/2002 | Motoyama et al. |
| 2002/0171857 A1 | 11/2002 | Hisatomi |
| 2002/0194350 A1 | 12/2002 | Lu et al. |
| 2003/0002074 A1 | 1/2003 | Miyano |
| 2003/0007170 A1 | 1/2003 | Kajita et al. |
| 2003/0011633 A1 | 1/2003 | Conley et al. |
| 2003/0011640 A1 | 1/2003 | Green et al. |
| 2003/0014515 A1 | 1/2003 | Motoyama et al. |
| 2003/0014529 A1 | 1/2003 | Simpson et al. |
| 2003/0033369 A1 | 2/2003 | Bernhard |
| 2003/0035133 A1 | 2/2003 | Berkema et al. |
| 2003/0038965 A1 | 2/2003 | Simpson et al. |
| 2003/0043205 A1 | 3/2003 | Hill |
| 2003/0043396 A1 | 3/2003 | Klosterman et al. |
| 2003/0048470 A1 | 3/2003 | Garcia |
| 2003/0048473 A1 | 3/2003 | Rosen |
| 2003/0049037 A1 | 3/2003 | Sadowara et al. |
| 2003/0053123 A1 | 3/2003 | Wu et al. |
| 2003/0063313 A1 | 4/2003 | Ito |
| 2003/0065766 A1 | 4/2003 | Parry |
| 2003/0065791 A1 | 4/2003 | Garg et al. |
| 2003/0081240 A1 | 5/2003 | Soto et al. |
| 2003/0084114 A1 | 5/2003 | Simpson et al. |
| 2003/0088642 A1 | 5/2003 | Price et al. |
| 2003/0118976 A1* | 6/2003 | Makishima et al. ........... 434/349 |
| 2003/0123112 A1 | 7/2003 | Kajita et al. |
| 2003/0142351 A1 | 7/2003 | Sakura |
| 2003/0164987 A1 | 9/2003 | Enomoto et al. |
| 2003/0169922 A1* | 9/2003 | Kamon ............... 382/173 |
| 2003/0182632 A1 | 9/2003 | Murdock et al. |
| 2003/0184552 A1 | 10/2003 | Chadha |
| 2003/0184590 A1 | 10/2003 | Will |
| 2003/0184782 A1 | 10/2003 | Perkins |
| 2003/0187922 A1 | 10/2003 | Ohara et al. |
| 2003/0188193 A1 | 10/2003 | Venkataramappa |
| 2003/0197883 A1 | 10/2003 | Lay et al. |
| 2003/0223766 A1 | 12/2003 | Imai |
| 2003/0225796 A1 | 12/2003 | Matsubara |
| 2003/0225829 A1 | 12/2003 | Pena et al. |
| 2003/0225894 A1 | 12/2003 | Ito |
| 2003/0231196 A1 | 12/2003 | Keohane et al. |
| 2004/0003341 A1 | 1/2004 | alSafadi et al. |
| 2004/0008363 A1 | 1/2004 | Suzuki et al. |
| 2004/0012628 A1 | 1/2004 | Kropf et al. |
| 2004/0012644 A1 | 1/2004 | Allen et al. |
| 2004/0039990 A1 | 2/2004 | Bakar et al. |
| 2004/0044779 A1 | 3/2004 | Lambert |
| 2004/0054573 A1 | 3/2004 | Shah et al. |
| 2004/0061729 A1 | 4/2004 | Green |
| 2004/0064759 A1 | 4/2004 | McGuire et al. |
| 2004/0070606 A1 | 4/2004 | Yang et al. |
| 2004/0080511 A1 | 4/2004 | Gilbert |
| 2004/0080771 A1 | 4/2004 | Mihira et al. |
| 2004/0080778 A1 | 4/2004 | Ito et al. |
| 2004/0098165 A1 | 5/2004 | Butikofer |
| 2004/0098316 A1 | 5/2004 | Philippe et al. |
| 2004/0098595 A1 | 5/2004 | Aupperle et al. |
| 2004/0105104 A1 | 6/2004 | Ishikawa et al. |
| 2004/0105122 A1 | 6/2004 | Schaeffer |
| 2004/0109028 A1 | 6/2004 | Stern et al. |
| 2004/0111670 A1 | 6/2004 | Sasakuma et al. |
| 2004/0113941 A1 | 6/2004 | Sliwa et al. |
| 2004/0117358 A1 | 6/2004 | von Kaenel et al. |
| 2004/0117784 A1 | 6/2004 | Endoh |
| 2004/0125403 A1 | 7/2004 | Furst et al. |
| 2004/0130744 A1 | 7/2004 | Wu et al. |
| 2004/0130749 A1 | 7/2004 | Aoki |
| 2004/0133525 A1 | 7/2004 | Singh et al. |
| 2004/0150663 A1 | 8/2004 | Kim |
| 2004/0158471 A1 | 8/2004 | Davis et al. |
| 2004/0161257 A1 | 8/2004 | Ishihara |
| 2004/0162076 A1 | 8/2004 | Chowdry et al. |
| 2004/0165209 A1 | 8/2004 | Aoki et al. |
| 2004/0169881 A1 | 9/2004 | Sato |
| 2004/0179229 A1 | 9/2004 | Laughlin |
| 2004/0203358 A1 | 10/2004 | Anderson |
| 2004/0205118 A1 | 10/2004 | Yu |
| 2004/0205533 A1 | 10/2004 | Lopata et al. |
| 2004/0205552 A1* | 10/2004 | Vosburgh ............... 715/513 |
| 2004/0205620 A1 | 10/2004 | Nishikiori et al. |
| 2004/0212823 A1 | 10/2004 | Chavers et al. |
| 2004/0215671 A1 | 10/2004 | Hyakutake et al. |
| 2004/0221231 A1 | 11/2004 | Madril et al. |
| 2004/0223778 A1 | 11/2004 | Zwiefelhofer |
| 2004/0226993 A1 | 11/2004 | Fulcher et al. |
| 2004/0227968 A1 | 11/2004 | Nakamura et al. |
| 2004/0230500 A1 | 11/2004 | Imago |
| 2004/0236862 A1 | 11/2004 | Ito et al. |
| 2004/0254955 A1 | 12/2004 | Reese et al. |
| 2004/0255263 A1 | 12/2004 | Ando |
| 2004/0268229 A1 | 12/2004 | Paoli et al. |
| 2004/0268306 A1 | 12/2004 | Cheng et al. |
| 2005/0005094 A1 | 1/2005 | Jamieson et al. |
| 2005/0015472 A1 | 1/2005 | Catania et al. |
| 2005/0026593 A1 | 2/2005 | Anderson et al. |
| 2005/0028086 A1 | 2/2005 | Itavaara et al. |
| 2005/0044248 A1 | 2/2005 | Mihira et al. |
| 2005/0055475 A1 | 3/2005 | MacKay et al. |
| 2005/0057560 A1 | 3/2005 | Bibr et al. |
| 2005/0060046 A1 | 3/2005 | Ito et al. |
| 2005/0060564 A1 | 3/2005 | Murakami et al. |
| 2005/0063010 A1 | 3/2005 | Giannetti |
| 2005/0068581 A1 | 3/2005 | Hull et al. |
| 2005/0071507 A1 | 3/2005 | Ferlitsch |
| 2005/0071746 A1 | 3/2005 | Hart et al. |
| 2005/0080649 A1 | 4/2005 | Alvarez et al. |
| 2005/0091087 A1 | 4/2005 | Smith et al. |
| 2005/0091419 A1 | 4/2005 | Ogura |
| 2005/0097458 A1 | 5/2005 | Wilson |
| 2005/0108353 A1 | 5/2005 | Yamamoto |
| 2005/0114267 A1 | 5/2005 | Miwa et al. |
| 2005/0114658 A1 | 5/2005 | Dye et al. |
| 2005/0114766 A1 | 5/2005 | Yamamoto |
| 2005/0129423 A1 | 6/2005 | Lester et al. |
| 2005/0149576 A1 | 7/2005 | Marmaros et al. |
| 2005/0152334 A1 | 7/2005 | Okamoto et al. |
| 2005/0185217 A1 | 8/2005 | Nishizawa et al. |
| 2005/0195221 A1 | 9/2005 | Berger et al. |
| 2005/0223413 A1 | 10/2005 | Duggan et al. |
| 2005/0231755 A1 | 10/2005 | Araumi et al. |
| 2005/0246428 A1 | 11/2005 | Araumi |
| 2005/0257134 A1 | 11/2005 | Goodman et al. |
| 2005/0257148 A1 | 11/2005 | Goodman et al. |
| 2005/0265744 A1 | 12/2005 | Uruta |
| 2006/0007480 A1 | 1/2006 | Yokokura |
| 2006/0010180 A1 | 1/2006 | Kawamura et al. |
| 2006/0015734 A1 | 1/2006 | Atobe |
| 2006/0031411 A1 | 2/2006 | Gimson et al. |
| 2006/0038004 A1 | 2/2006 | Rielly et al. |
| 2006/0056873 A1 | 3/2006 | Kimura |
| 2006/0059434 A1 | 3/2006 | Boss et al. |
| 2006/0064647 A1 | 3/2006 | Tapuska et al. |
| 2006/0077423 A1 | 4/2006 | Mathieson et al. |
| 2006/0077432 A1 | 4/2006 | Lovat et al. |
| 2006/0077439 A1* | 4/2006 | Yamamura et al. ........... 358/1.15 |
| 2006/0077444 A1 | 4/2006 | Lum et al. |
| 2006/0085835 A1 | 4/2006 | Istvan et al. |
| 2006/0103588 A1* | 5/2006 | Chrisop et al. ............... 345/2.1 |
| 2006/0112123 A1 | 5/2006 | Clark et al. |

| | | | |
|---|---|---|---|
| 2006/0154227 A1 | 7/2006 | Rossi et al. | |
| 2006/0162076 A1 | 7/2006 | Bartlett et al. | |
| 2006/0198653 A1 | 9/2006 | Plewnia et al. | |
| 2006/0224405 A1 | 10/2006 | White et al. | |
| 2006/0279475 A1 | 12/2006 | Lum et al. | |
| 2007/0022180 A1 | 1/2007 | Cocotis et al. | |
| 2007/0041035 A1 | 2/2007 | Sembower et al. | |
| 2007/0078805 A1* | 4/2007 | Reddy et al. | 707/1 |
| 2007/0089049 A1* | 4/2007 | Gormish et al. | 715/507 |
| 2007/0094103 A1 | 4/2007 | Hyakutake et al. | |
| 2007/0146823 A1* | 6/2007 | Borchers et al. | 358/496 |
| 2007/0173266 A1 | 7/2007 | Barnes, Jr. | |
| 2007/0174894 A1 | 7/2007 | Matsunaga | |
| 2008/0046806 A1* | 2/2008 | Reddy et al. | 715/221 |
| 2008/0072162 A1 | 3/2008 | Dauerer et al. | |
| 2011/0072395 A1* | 3/2011 | King et al. | 715/825 |

FOREIGN PATENT DOCUMENTS

| | | |
|---|---|---|
| JP | 04-274551 A | 9/1992 |
| JP | 07-282065 | 10/1995 |
| JP | 08234945 | 9/1996 |
| JP | 09293036 | 11/1997 |
| JP | 09330190 | 12/1997 |
| JP | 10013695 | 1/1998 |
| JP | 10154190 A | 6/1998 |
| JP | 10-232946 | 9/1998 |
| JP | 10240490 | 9/1998 |
| JP | 2000112691 | 4/2000 |
| JP | 2000174949 | 6/2000 |
| JP | 2000207108 | 7/2000 |
| JP | 2002259071 | 2/2001 |
| JP | 2001243486 A | 9/2001 |
| JP | 200284383 | 3/2002 |
| JP | 2002140195 A | 5/2002 |
| JP | 2002175195 | 6/2002 |
| JP | 2002-196257 | 7/2002 |
| JP | 2002236830 | 8/2002 |
| JP | 2002298049 A | 10/2002 |
| JP | 2002312148 | 10/2002 |
| JP | 2002330253 | 11/2002 |
| JP | 2002351644 | 12/2002 |
| JP | 2003022258 | 1/2003 |
| JP | 2003050781 | 2/2003 |
| JP | 2003157155 A | 5/2003 |
| JP | 2003178023 | 6/2003 |
| JP | 2003196554 A | 7/2003 |
| JP | 2003198792 | 7/2003 |
| JP | 2003208484 | 7/2003 |
| JP | 2003209644 | 7/2003 |
| JP | 2003216368 | 7/2003 |
| JP | 2003216395 A | 7/2003 |
| JP | 2003223299 | 8/2003 |
| JP | 2003260853 | 9/2003 |
| JP | 2003281227 | 10/2003 |
| JP | 2003288179 | 10/2003 |
| JP | 2003308195 | 10/2003 |
| JP | 200430448 | 1/2004 |
| JP | 2004088561 | 3/2004 |
| JP | 2004094313 | 3/2004 |
| JP | 2000122517 A | 4/2004 |
| JP | 2004128561 | 4/2004 |
| JP | 2004118549 | 5/2004 |
| JP | 2004164157 A | 6/2004 |
| JP | 2004213356 | 7/2004 |
| JP | 2004215309 | 7/2004 |
| JP | 2004222247 | 8/2004 |
| JP | 2004228686 | 8/2004 |
| JP | 2004228687 | 8/2004 |
| JP | 2004240752 | 8/2004 |
| JP | 2004246771 | 9/2004 |
| JP | 2004310326 | 11/2004 |
| JP | 2004310516 | 11/2004 |
| JP | 2004276271 | 12/2004 |
| JP | 2004358800 | 12/2004 |
| JP | 2005014591 | 1/2005 |
| JP | 2005033460 | 2/2005 |
| JP | 2005059496 | 3/2005 |
| JP | 2005078278 | 3/2005 |
| JP | 2005084891 | 3/2005 |
| JP | 2005004243 | 6/2005 |
| JP | 2005209059 | 8/2005 |
| JP | 2005219440 A | 8/2005 |
| JP | 2005235034 A | 9/2005 |
| JP | 2005269250 | 9/2005 |
| JP | 2006053905 | 2/2006 |
| JP | 2006140898 | 6/2006 |
| WO | WO0118754 A1 | 3/2001 |
| WO | WO01/33381 | 5/2001 |
| WO | WO0198864 | 12/2001 |

OTHER PUBLICATIONS

R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).

T. Hastings, "Internet Printing Protocol/1.1: Model and Semantics" (Sep. 2000, retrieved from http://www.ietf.org/rfc/rfc291.txt on Sep. 18, 2008, pp. 1-210).

R. Herriot, Internet Printing Protocol (IPP): Event Notifications and Subscriptions, Jun. 21, 2004, http://tools.ietf.org/html/draft-ietf-ipp-not-spec-12, pp. 1-98.

Microsoft Corporation. Microsoft Computer Dictionary, Fifth Edition, 2002 Microsoft Press, pp. 487-488.

Gaedke, Martin et al. "A Modeling Approach to Federated Identity and Access Management", May 2005 ACM.

FOLDOC. "relational database", Jun. 2002, retrieved from <http://foldoc.org/index.cgi?query=relational+database>.

OASIS. "Security Assertion Markup Language (SAML) 2.0 Technical Overview", Working Draft 01, Jul. 22, 2004, <http://www.oasis-open.org/committees/documents.php?wg_abbrev=security>.

Hartman, Bret et al. Mastering Web Services Security, 2003 Wiley Publishing, Inc., pp. 36-46.

U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.

U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Canon USA, Inc.; MEAP Multifunctional Embedded Application Platform; Aug. 2004; http://developersupport.canon.com/MEAP.htm.
Canon USA, Inc.; MEAP; FAQ; accessed on Jul. 2004, pub. date unknown; http://developersupport.canon.com/MEAP.htm.
Xerox, Inc.; XEROX FreeFlow digital workflow collection; 2003; http://www.xerox.com/downloads/usa/en/s/solutions_digital_workflow_whitepaper_sdk.pdf.
Ricoh Company, Ltd.; Ricoh's Medium-Term Management Plan; Mar. 19, 2002; http://www.ricoh.com/IR/data/pre/pdf/ir_pre2002.pdf.
Ricoh Company, Ltd.; White Paper; Embedded Software Architecture SDK; Jun. 25, 2003; http://www.ricoh-usa.com/products/concept/esa.asp?catname=ESA.
Hewlett-Packard Company; JetCAPS Scan2Folder; 2003; http://www.jetcaps.se/resources/datasheets/ds_scan2folder.pdf.
Hewlett-Packard Company; JetCAPS chai applications; Dec. 9, 2002; http://www.stethos.com/chai/data/d_us_chai.pdf.
Japanese Office Action—Application No. 2008-054363—Dated Sep. 14, 2010.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.
U.S. Appl. No. 11/218,033—Final Office Action dated May 14, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.
U.S. Appl. No. 11/233,201—Non-Final Office Action dated Sep. 15, 2010.
U.S. Appl. No. 11/232,552—Final Office Action dated Aug. 19, 2010.
U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.

Ratha, N.K., Connell, J.H., Bolle, R.M. "Enhancing security and privacy in biometrics-based authentication systems". IBM Systems Journal 40(3), pp. 614-634 (2001).
U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588- Non-Final Office Action dated Apr. 1, 2009.
U.S. Appl. No. 11/232,588—Final Office Action dated Nov. 27, 2009.
U.S. Appl. No. 10/961,793—Non- Final Office Action dated Jun. 24, 2009.
U.S. Appl. No. 10/961,793—Final Office Action dated Feb. 4, 2010.
U.S. Appl. No. 10/961,911—Non- Final Office Action dated Jun. 8, 2009.
U.S. Appl. No. 10/961,911—Non- Final Office Action dated Feb. 3, 2010.
U.S. Appl. No. 10/962,103—Non- Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.
U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non- Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.
U.S. Appl. No. 11/562,342—Non-Final Office Action dated May 29, 2009.
U.S. Appl. No. 11/562,342—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.

JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Decision to Grant—Japanese Patent Application No. 2006-256440—Mailing Date Oct. 19, 2010.

* cited by examiner

METHODS AND SYSTEMS FOR DISASSEMBLY AND REASSEMBLY OF EXAMINATION DOCUMENTS

RELATED REFERENCES

This application is a continuation-in-part of U.S. patent application Ser. No. 10/962,248, entitled "Methods and Systems for Imaging Device Remote Application Interaction," filed on Oct. 8, 2004, now U.S. Pat. No. 8,018,610; this application is also a continuation-in-part of U.S. patent application Ser. No. 10/961,793, entitled "Methods and Systems for Imaging Device Remote Form Management," filed on Oct. 8, 2004, now U.S. Pat. No. 8,035,831; this application is also a continuation-in-part of U.S. patent application Ser. No. 10/961,911, entitled "Methods and Systems for Imaging Device Remote Location Functions," filed on Oct. 8, 2004; this application is also a continuation-in-part of U.S. patent application Ser. No. 10/961,594, entitled "Methods and Systems for Imaging Device Document Management," filed on Oct. 8, 2004; and this application is also a continuation-in-part of U.S. patent application Ser. No. 10/962,103, entitled "Methods and Systems for Imaging Device Document Translation," filed on Oct. 8, 2004, now U.S. Pat. No. 7,969,596. U.S. patent application Ser. No. 10/962,248, U.S. patent application Ser. No. 10/961,793, U.S. patent application Ser. No. 10/961,911, U.S. patent application Ser. No. 10/961,594, and U.S. patent application Ser. No. 10/962,103 are hereby incorporated by reference herein.

BACKGROUND OF THE INVENTION

Imaging devices such as printers, copiers, scanners and fax machines may have a wide array of functions and capabilities to fit specific uses or combinations of uses. Imaging devices may take the form of a multi-function peripheral device (MFP) that combines the functions of two or more of the traditionally separated imaging devices. An MFP may combine any number of imaging devices. An exemplary MFP may comprise the functions of a printer, scanner, copier and fax machine.

Some imaging devices may contain computing resources for data storage and processing such as processors, hard disk drives, memory and other devices. As imaging devices add more features and functions, they may become more costly and complex.

Some imaging devices and MFPs may comprise network connectivity to provide communication with other computing devices, such as personal computers, other imaging devices, network servers and other apparatus. This connectivity may allow the imaging device to use off-board resources that are available on a connected network.

Imaging devices may have a user input panel comprising an array of buttons, knobs and other user input devices. Some imaging devices may have a display panel, which may be for display only, or alternatively may be a touch panel display that enables user input directly on the display.

Devices with touch panel displays or displays with buttons arranged in cooperation with the display may display menu data that may be selected by user input. This menu data may be driven by an on-board server module within the imaging device.

BRIEF SUMMARY OF THE INVENTION

Some embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

Some embodiments of the present invention comprise systems and methods for combining documents. Some embodiments of the present invention comprise systems and methods for combining documents with an imaging device in conjunction with a remote computing device.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION

Figure 1:
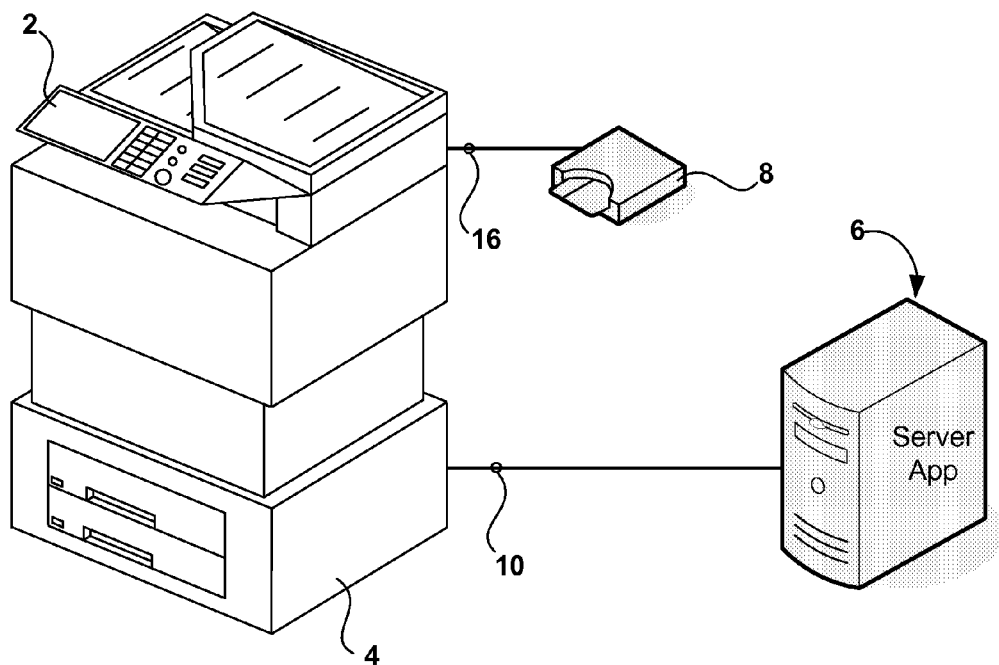
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that may not be practical within the imaging device may be performed on the server but may be accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. An exemplary imaging device may be a multi-function peripheral device (MFP) comprising the capability to perform a plurality of imaging functions. An exemplary MFP may comprise the functions of a printer, a scanner, a copier and a facsimile machine or image transmitter/receiver. Other MFP imaging devices may comprise other combinations of imaging functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
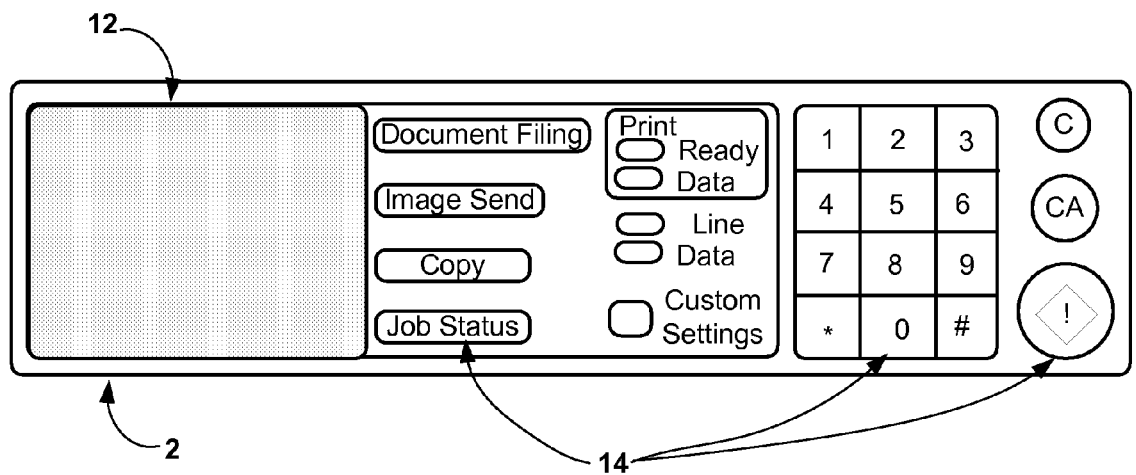
FIG. 2 is an image of an exemplary user interface for an imaging device.

Some embodiments of the present invention may be described in relation to FIG. 1 and FIG. 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 16, such as a USB connection, a network cable, a wireless connection or some other communications link. The separate UI device 8 may comprise an input device, such as a keyboard or buttons, as well as a display device, which may also be a touch screen panel. The separate UI device 8 may also comprise an interface for transfer of instructions that are input to the device 8 from a remote input device. This form of the UI device 8 may comprise memory sticks, Universal Serial Bus (USB) memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Some embodiments of the present invention allow network applications running on remote computing devices to interact with the user of the imaging device through the imaging device I/O panel. These embodiments allow imaging device user interface (UI) control (e.g., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Some embodiments of the present invention comprise network-based applications that may have full control over the imaging device UI to display text and graphics in any format. In these embodiments, the application may programmatically display buttons, textboxes, graphics, etc. in any layout desired.

In some embodiments, the UI layout may be programmed using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application may be able to request a keyboard UI to be displayed on the imaging device display 12, 8. In some embodiments, this functionality may be available on the imaging device and may not need to be recreated by remote computing device applications. In some embodiments, the remote computing device may define the keyboard prompt and default values. These embodiments may comprise a remote computing device that is able to rename imaging device UI buttons, such as the "OK" and "Cancel" buttons, as well as define additional buttons.

In some embodiments, menu templates may be served to the imaging device UI by the imaging device 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it may check to see if an External Authorization application is registered. If so, the imaging device may be placed in disabled mode and the application may be contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
| --- | --- | --- |
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

Remote Computing Device Applications

In some embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points may be based on a user action ("trigger") for which applications may register. In some embodiments, applications may be registered with target devices so that the device knows that when a particular trigger occurs on the front panel to contact an associated particular remote computing device for instructions. In exemplary embodiments, applications may be integrated with an imaging device at any of several trigger points.

Remote computing devices may be registered to a specific function and contacted when that function's hardware key is pressed (e.g., "Image Send") on the imaging device UI. UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu may be displayed with the solutions registered to that function. Users may select the desired solution and the remote computing device may be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu may be displayed with the solutions applications registered to the generic RCD mode. Users may select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in Table 2.

TABLE 2

Exemplary Hardware Key Assignments

| Button Press | Standard IDev Mode | RCD Mode |
| --- | --- | --- |
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the "*" key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g., provide user with instructions for clearing jam).

Control Handoffs

In some embodiments, at different points throughout an imaging job, several applications may require control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g., default file format is PDF, but the user may change; color mode is set to B/W and the user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native "Image Send" screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application file transfer protocol (FTP) server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the hard disk drive (HDD). If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that may limit what each user may be allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step, the job may be either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file may be output. In typical embodiments, the file may either be sent over the network to be printed or printed locally. At the end of this step, a notification that the job was successfully completed may be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API may allow applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
|---|---|
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
|---|---|---|---|---|---|---|---|
| JOB Characteristics ||||||||
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics ||||||||
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit mode—in these embodiments, when an application enables the device it may specify if the current job requires authorization. If so, the job may be spooled to memory and click information (e.g., as defined in Table 4) may be sent to an RCD. An RCD may then notify the device if the job should be deleted or output sent. At this point, the application also may have the option of changing job parameters. If the application does not require authorization, the job may continue as normal and a click report may be sent at the end of the job.

Print job accounting—in these embodiments, an RCD may monitor print jobs in addition to walk-up functions. For print job accounting, an IDev may monitor all incoming print jobs and send accounting data in the PJL header to an RCD for verification before printing the job. The RCD may evaluate the accounting data (or lack thereof) and inform the IDev to continue with or cancel the job.

Report on unidentified jobs—in these embodiments, an RCD may also monitor print jobs that it cannot associate to a specific user, such as device reports and incoming fax jobs.

The RCD may register to receive click counts for all unidentified jobs, so that it may bill them to a general account.

Device Management API

In some embodiments of the present invention, a Device Management API may allow a network application to remotely setup and manage the imaging device. In exemplary embodiments, the Device Management API may provide an RCD with the following controls:

Device status—an RCD may request the current status of the device. This may be the same status information as reported on the embedded web pages.

Device configuration—an RCD may retrieve a list of installed options supported by the device.

Web Page settings—an RCD application may retrieve and set any of the values that are configurable on the embedded web pages.

Key Operator Programs—an RCD application may retrieve and set any of the values that are configurable in Key Operator Programs, including software keys.

Custom Settings—an RCD application may retrieve and set any of the values that are configurable in Custom Settings.

Job Status—an RCD application may retrieve the current job queue and history information and reprioritize or delete jobs in the queue.

Click counts—an RCD application may retrieve device total counts and clicks for each function by account code.

Data Security settings—an RCD application may retrieve the status information on the DSK (e.g., last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings may be included. In some embodiments, API's may be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security" and "cancel jobs of invalid accounts."

Manage Account Codes—an RCD may add, edit, or delete account codes.

Account Limits—an RCD application may specify a maximum number of clicks by function for individual account codes or for all account codes.

Account Reset—an RCD application may reset the click count for an individual account or for all accounts.

Retrieve Clicks—an RCD may retrieve the number of clicks by function for each account code.

Font and Form Management API

Some embodiments of the present invention may comprise a Font and Form Management API, which may allow an RCD application to remotely download and manage fonts and forms in mass-storage. In some exemplary embodiments, a Font and Form Management API may provide a remote computing device with the following controls:

Mass storage control—an RCD application may retrieve mass storage status information including storage capacity, space available, and write-protect mode plus modify write-protect status.

Resource list—an RCD application may retrieve a list of stored fonts and forms including font or macro ID, font number, font/form name, escape sequence, and file size.

Download resource—an RCD application may download PCL fonts, PCL macros, and PS fonts and forms. Any special processing that may be performed when a resource is downloaded via the web pages may be performed when the resource is downloaded via embodiments of the present invention.

Delete resource—an RCD application may delete any resource stored in mass storage.

Upload resources—an RCD application may upload an individual resource or all resources. On devices where effective memory management is unavailable, a server application may use this function to "defrag" mass storage.

Font/macro ID's—an RCD application may assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

Firmware versions—an RCD application may retrieve the current firmware version numbers.

Service mode—an RCD application may place the MFP in service mode to lockout other jobs that will interfere with firmware upgrade. Upon receiving a service mode request, the IDev may stop accepting incoming jobs, complete all jobs in the queue, and then notify the server that it is in service mode.

Update firmware—an RCD may download an updated firmware version to the device. If a reboot is necessary, the IDev may perform it automatically when download is complete.

Download status—the IDev may send a status notification (success/error) to an RCD after firmware download.

Revert to previous version—if firmware update is not successful, the application may request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

Image Send Parameters—a remote computing device application may get and set values for the following scan and fax parameters:

COLOR OR B/W

IMAGE MODE—TEXT, TEXT/PHOTO, PHOTO; EXPOSURE LEVEL

RESOLUTION

FILE FORMAT—FILE TYPE, COMPRESSION, AND PAGES PER FILE

ORIGINAL—ORIGINAL SIZE, SIMPLEX/DUPLEX, ROTATE, AND JOB BUILD

FILENAME

SUBJECT

MESSAGE

SENDER
SCHEDULE SEND TIME
PAGE DIVISION (BOOK SCANNING)
COVER PAGE
TRANSMISSION MESSAGE (CONFIDENTIAL, URGENT, ETC.)
THIN PAPER SCANNING
DESTINATION
DOCUMENT FILING

Initiate Scan—the remote computing device application may initiate the scan function (same as a user pressing the "start" button).

In some embodiments, a remote computing device may change the default values on the imaging device or the values for the current job. For the current job, the remote computing device may also specify if scan parameters may be modified by the user or not. If one remote computing device application (e.g., Access Control) specifies that a parameter cannot be changed and then a second application (e.g., Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

PJL sniffing—an RCD application may register with the IDev to be contacted for instructions when a specific PJL command is found in a print job. The RCD may then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

Copy Parameters—an RCD application may get and set values for the following copy parameters:
COLOR OR B/W
EXPOSURE—TEXT, TEXT/PHOTO, PHOTO, SUPER PHOTO; EXPOSURE LEVEL
PAPER SELECT (BY TRAY)
COPY RATIO
2-SIDED COPY—1TO1, 1TO2, 2TO2, 2TO1; BINDING EDGE
OUTPUT—OUTPUT TRAY, SORT, STAPLE, GROUP, OFFSET
ORIGINAL SIZE
SPECIAL FUNCTIONS—MARGIN SHIFT, ERASE, PAMPHLET, ETC.
DOCUMENT FILING Initiate Copy—an RCD application may initiate the copy function (same as a user pressing the "start" button).

In some embodiments, a remote computing device may change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

Backup/restore—the remote computing device application may import and export a batch file with all Document Filing data. In some embodiments, this package may be in a proprietary format since it may contain documents that are password-protected and may not be accessed individually—for example when restoring in case of failure or cloning to other devices.

File/folder list—the remote computing device application may retrieve, modify, and create new files and folders to be stored on the IDev (also covered in device management).

Download file—the remote computing device may download a new file to the Document Filing systems and specify folder, filename, username, and password.

User list—the remote computing device application may retrieve, modify, and create new users to be stored on the IDev (also covered in device management).

HDD Status—the remote computing device application may retrieve the current HDD status comprising the % allocated to the main folder, quick folder, and custom folders and the % remaining.

Doc Filing Parameters—the remote computing device application may get and set values for storing a file to Doc Filing including the following exemplary parameters:
EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE COPY, 2IN1, JOB BUILD, CARD SHOT Initiate Print—the remote computing device application can select a stored file and initiate a print including the following exemplary parameters:
PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING Initiate Send—the remote computing device application may select a stored file and initiate a send including the following exemplary parameters:
RESOLUTION
FILE FORMAT
DESTINATION
TIMER
SENDER
FILENAME
SUBJECT
MESSAGE Security Allowing external applications to control an imaging device may open up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments may provide extensive access and control of the imaging device, which may pose a significant security risk. The interface of these embodiments may be protected from access by attackers, while maintaining ease of setup and use for valid solutions.

Confidential data (for example, user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is in contact with to ensure an intruder cannot imitate the imaging device to collect network configuration and password information, monitor file/folder structures of a document management system, or spoof security settings and DSK (Data Security Kit) status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g., someone disconnects network cable), the imaging device may immediately be disabled and an error message displayed.

An administrator may be able to adjust a security level based on company and application requirements. Security requirements may have a large impact on the time it takes to develop a remote computing device application and the resources required to implement the solution. Users using some embodiments of the present invention may range from a small business with one imaging device, no IT staff, and a simple scan or print application to a large government office using access control and audit trails to track all device activity. The security measures used to protect imaging device interfaces may be adjustable by the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it may be desirable for the applications to pass user credentials to each other, so that each one does not have to repeat the authentication process.

Figure 3:
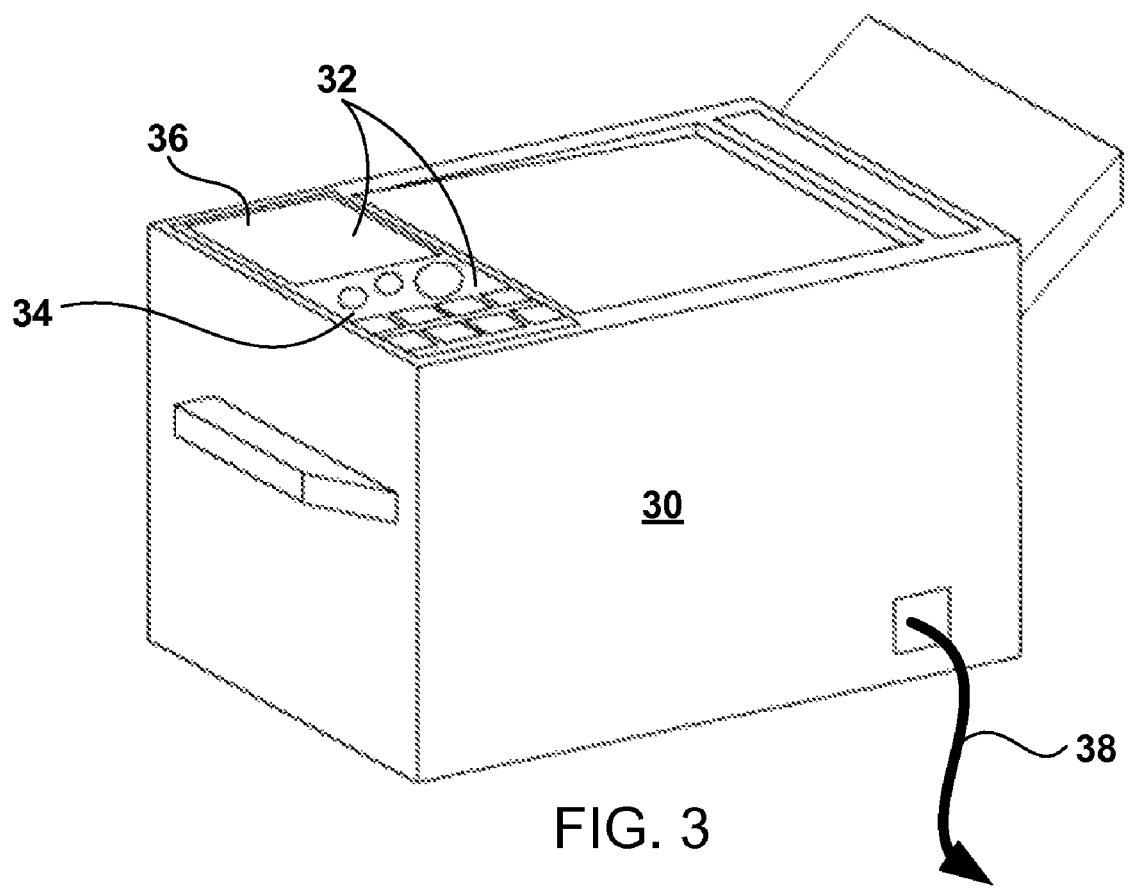
FIG. 3 shows an exemplary imaging device.

Some embodiments of the present invention may be described in relation to FIG. 3. These embodiments may comprise an imaging device only, which is configured to interact with a remote computing device, such as a server, through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

The imaging device 30 may be capable of performing one or more imaging functions including, but not limited to, scanning, printing, copying, facsimile transmission (sending and receiving) and others.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11 (b) compliant connection, a Bluetooth connection, an Infrared Data Association (IRDA) connection or some other wireless connection.

Figure 4:
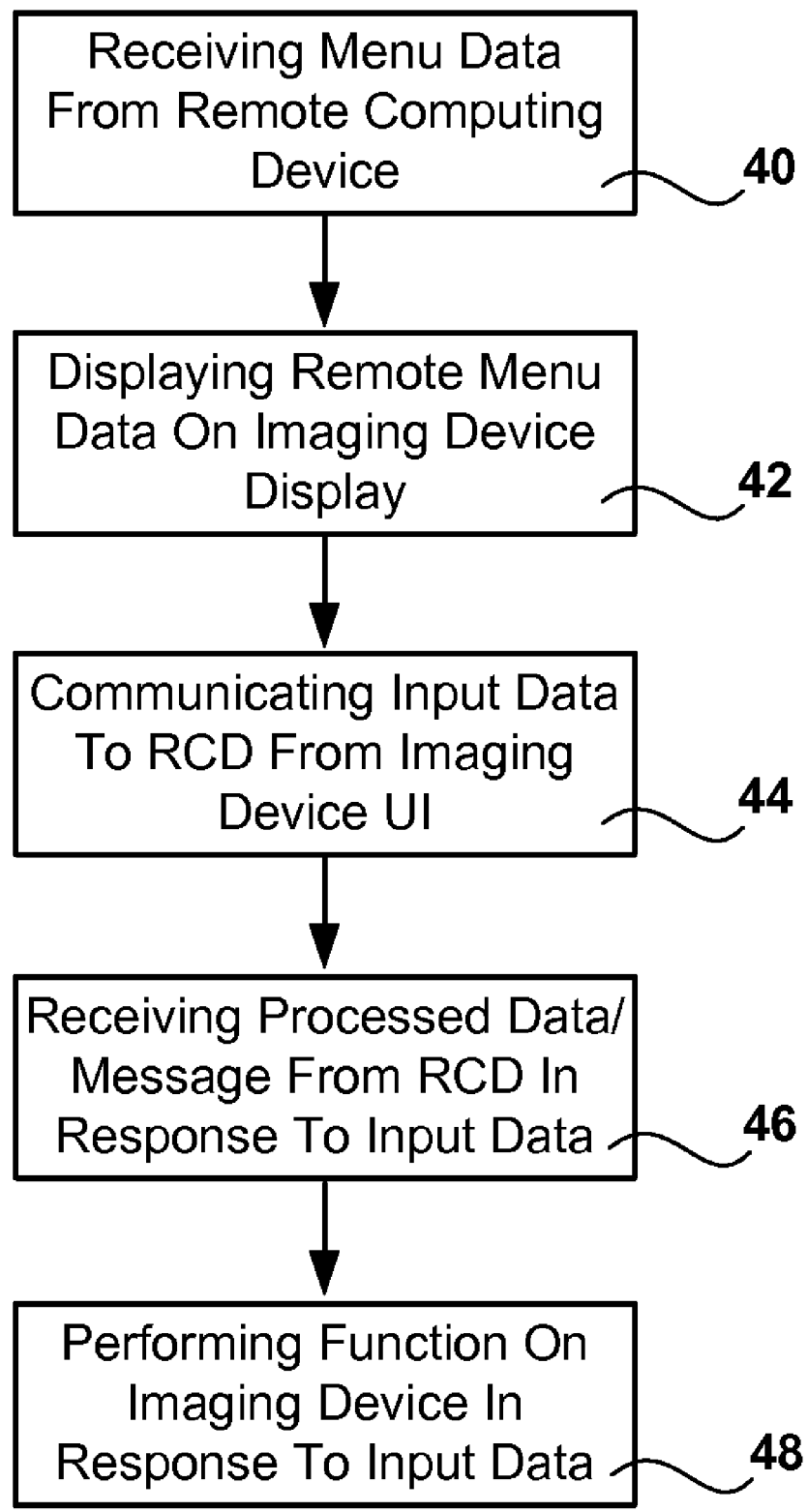
FIG. 4 is a chart depicting steps of an imaging device method.

The operation of some imaging device embodiments may be explained with reference to FIG. 4. In these embodiments, menu data may be received 40 from a remote computing device (not shown in FIG. 3), which may connected to the imaging device 30 via the communication link 38 through a wired or wireless connection. This menu data may be then displayed 42 on the imaging device user interface display 36. This display of remote menu data may be intended to prompt a user to make an input on the user interface input device 34.

Imaging devices of these embodiments may be further configured to accept input from a user in response to a display of remote menu data and may communicate 44 that user input to a remote computing device. In some embodiments, this user input data may be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (e.g., scanning, copying, printing, fax transmission) on the imaging device in response to the receipt 46 of processed data.

Figure 5:
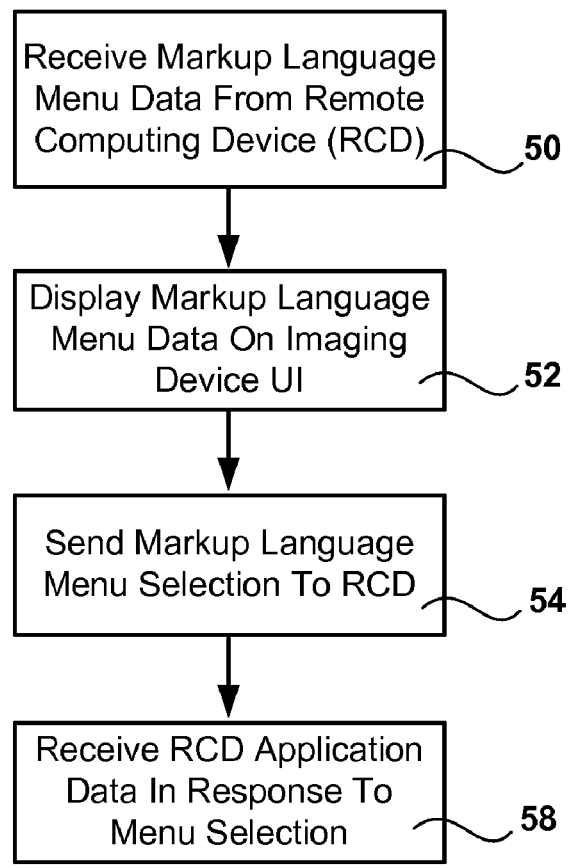
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data may be intended to prompt user input on imaging device user interface 32. Display 52 of the remotely-stored menu data may be accomplished with a browser application that is native to the imaging device 30.

In these embodiments, the imaging device 30 may be configured to route 54 user input received though its user interface 32 to a remote computing device. The remote computing device that receives the user input may then run an application or otherwise process the user input and return the results of the processing to the imaging device 30. Accordingly, the imaging device 30 may be configured to receive 56 processed data from a remote computing device. In some embodiments, the imaging device 30 may perform one or more functions in response to the receipt 56 of processed data.

Figure 6:
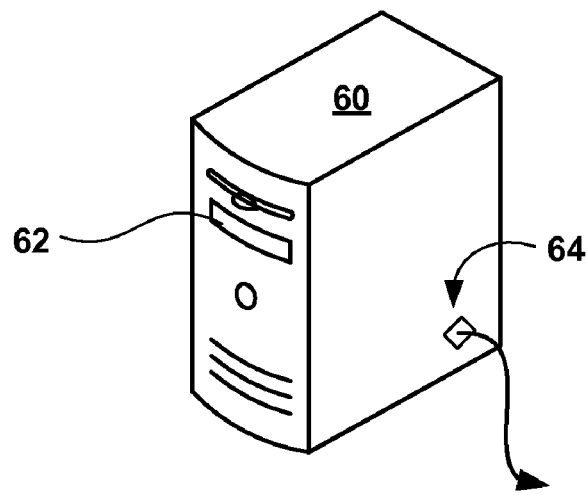
FIG. 6 shows an exemplary remote computing device embodiment.

Some embodiments of the present invention may be explained with reference to FIG. 6. These embodiment comprise a remote computing device (RCD) 60, which has a communications link 64. The communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IRDA) standard or some other wireless connection. In some embodiments, the RCD 60 may further comprise a data storage device 62, which is typically a hard drive, but may also be an optical drive device, such as an array of compact disk drives, flash memory or some other storage device.

Figure 7:
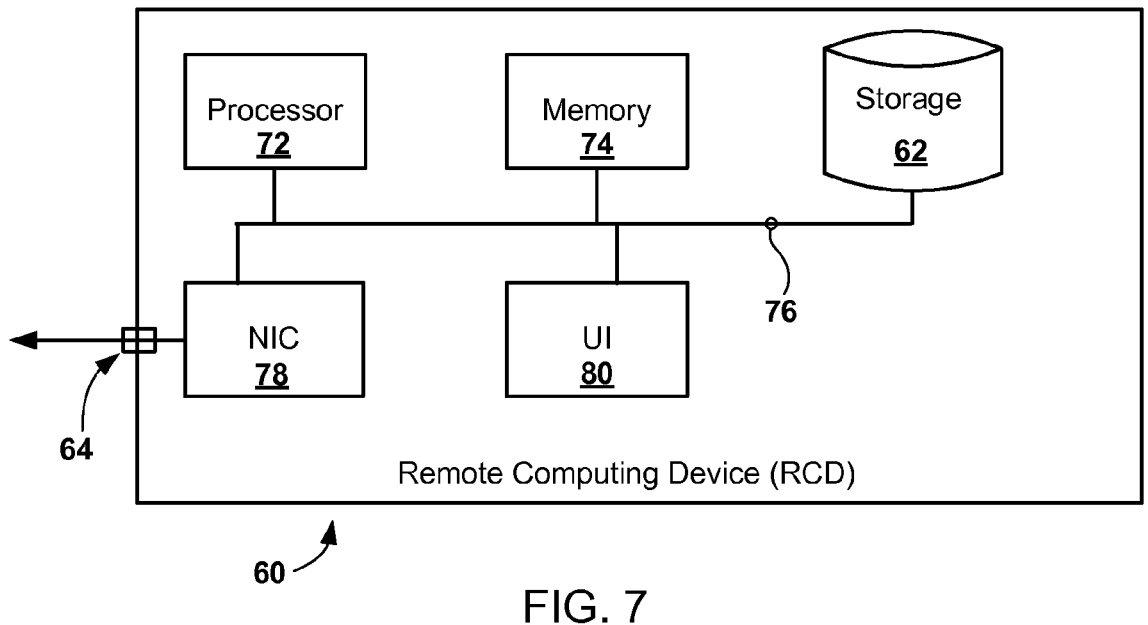
FIG. 7 is a diagram showing components of an exemplary remote computing device.

Embodiments of the RCD 60 may be further described with reference to FIG. 7. In these embodiments, the RCD 60 comprises a processor 72 for processing data and running programs such as operating systems and applications. RCD 60 may further comprise memory 74, which may be in the form of Random Access Memory (RAM) and Read Only Memory (ROM). Applications processed by processor 72 may be loaded into memory 74. The RCD 60 may further comprise a network interface 78, which allows the RCD 60 to communicate with other devices, such as an imaging device 30. In some embodiments, the RCD 60 may also comprise a user interface 80, but this may not required in many embodiments. The storage 62 may be used to store applications and data that may be accessed by an imaging device 30 of embodiments of the present invention. The processor 72, memory 74, storage 62, network interface 78 and, optionally, user interface 80 may be linked by a system bus 76 to enable data transfer between each component. The communications link 64 may couple the RCD 60 to other devices via network interface 78.

Figure 8:
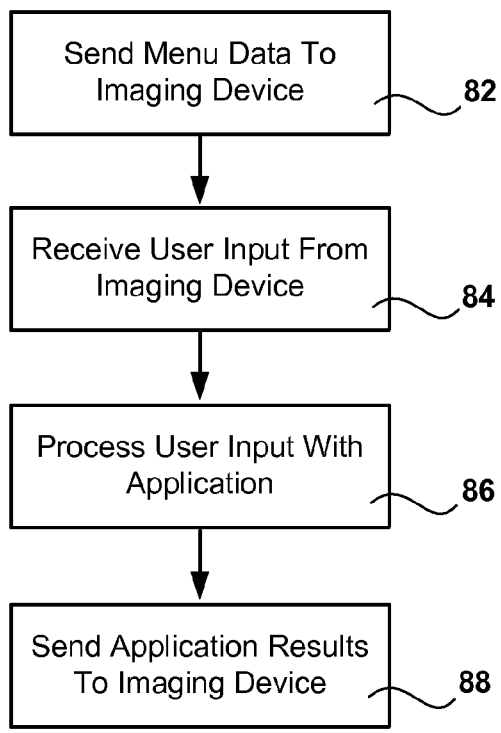
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments, menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device may be stored on the RCD 60.

An RCD 60, of some embodiments, may be further configured to receive 84 user input obtained through the user interface 32 of an imaging device 30 and transferred to the RCD 60 over communications links 38 and 64. Once this input data is received at an RCD 60, the input data may be processed 86. Exemplary processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
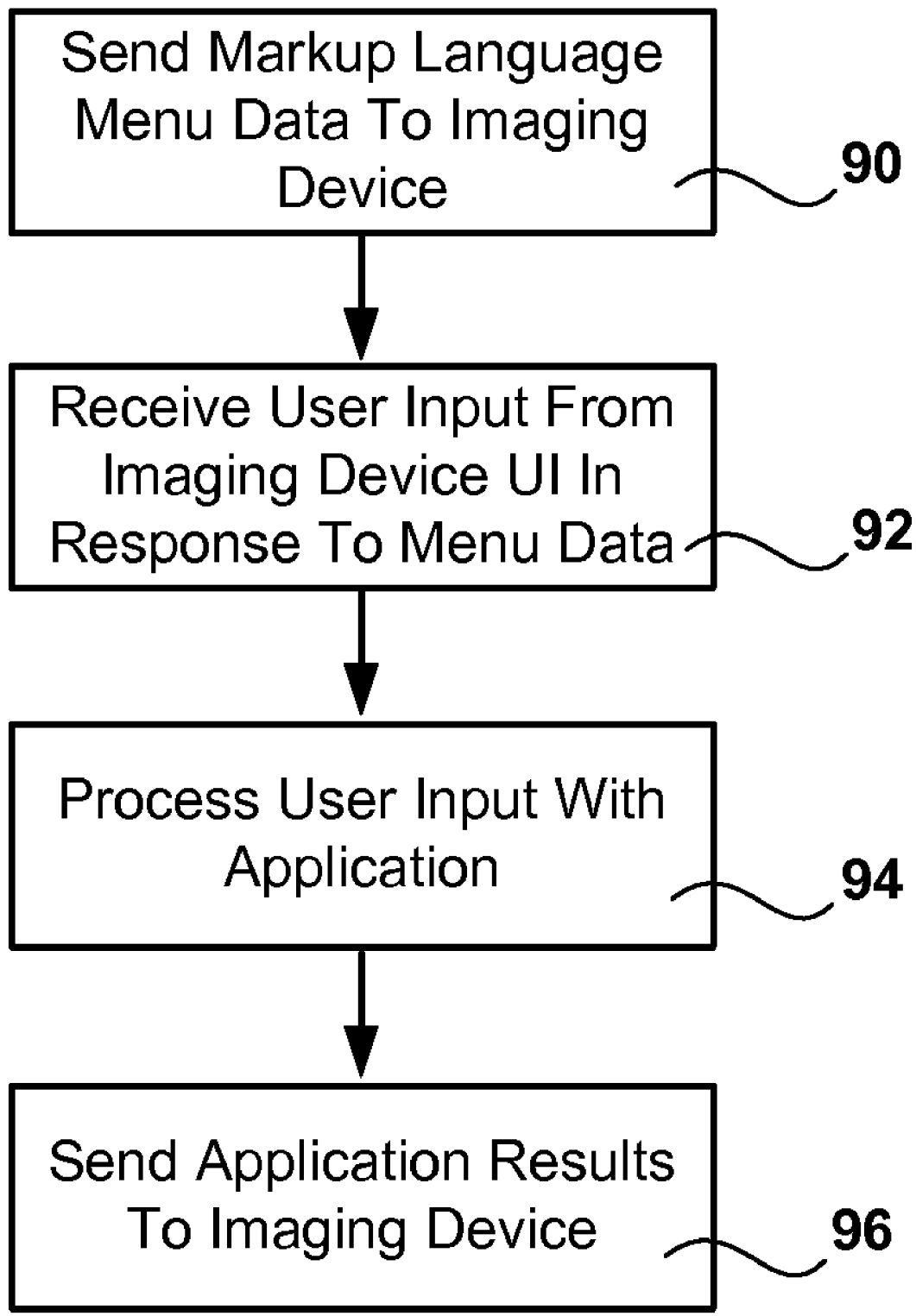
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data may be then received at the imaging device 30 and displayed to a user. This may prompt the user to enter an input on the imaging device user interface 32. This user input may be sent by the imaging device 30 to the RCD 60. The RCD 60 may then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
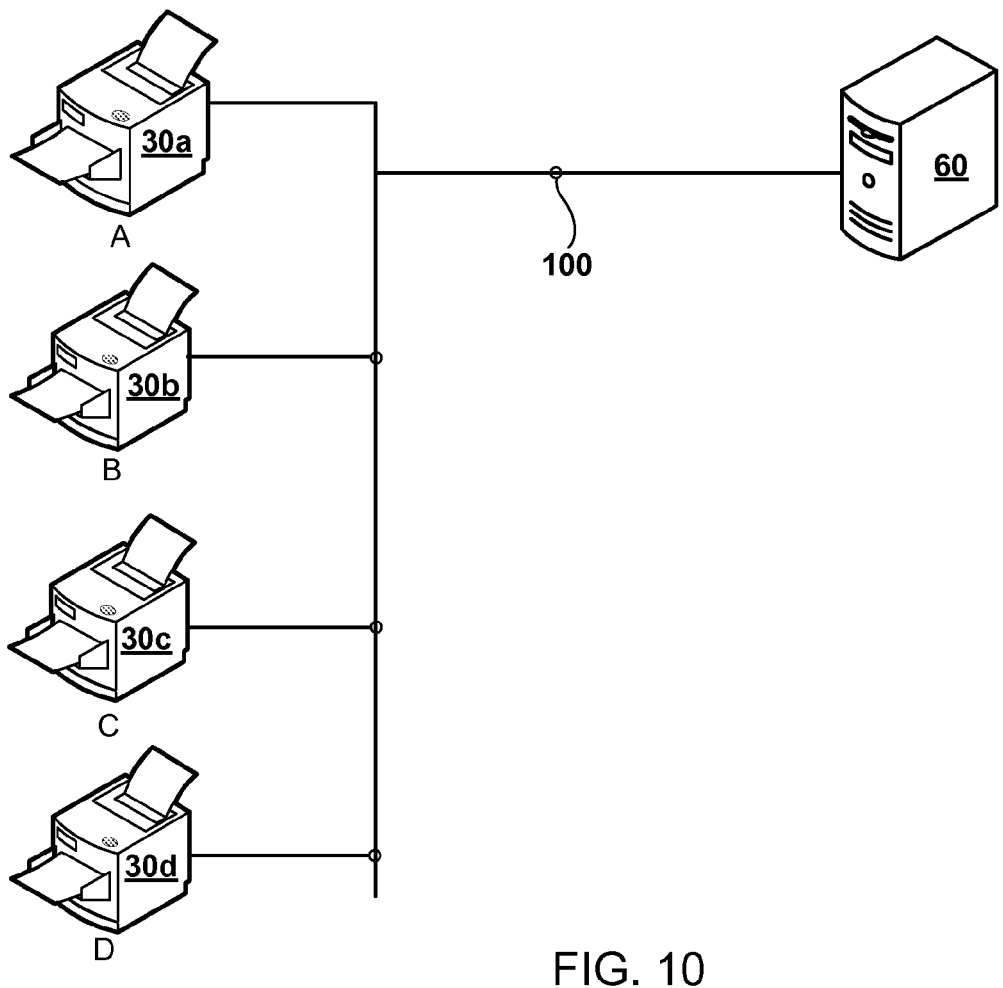
FIG. 10 is a diagram showing a system comprising multiple imaging devices in connection with a remote computing device.
Figure 11A:
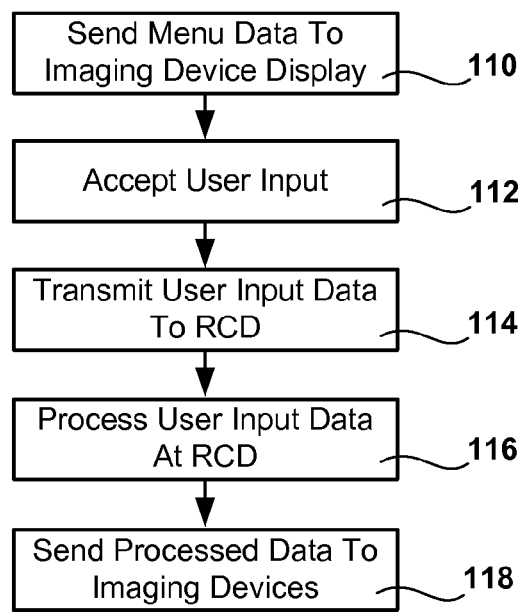
FIG. 11A is a chart showing steps of a method that may be employed by the system depicted in FIG. 10.

Some embodiments of the present invention may be described with reference to FIG. 10 and FIG. 11A. These embodiments comprise at least one RCD 60 and a plurality of imaging devices 30*a*-30*d*. In these embodiments, at least one of the imaging devices 30*a*-30*d* comprises a user interface 32 with a display 36 and user input panel 34 that is integral with the display (e.g., touch-screen) or a separate input unit. The RCD 60 may be connected to the imaging devices 30*a*-30*d* by a communications link and network 100 to enable data transmission between the RCD 60 and the imaging devices 30*a*-30*d*.

In these embodiments, menu data may be stored on the RCD 60 and sent 110 to at least one of the imaging devices 30*a*-30*d* where the menu data may be displayed on a user interface. Any of the imaging devices 30*a*-30*d* that receive the menu data may be configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30*a*-30*d*.

In these embodiments, a single RCD 60 may be used to provide processing power, resources and functionality to a plurality of imaging devices 30*a*-30*d* without reproducing these resources in each imaging device. In some embodiments, data generated by input on one imaging device 30*a* may be directed to another imaging device 30*d* for processed data output or final processing.

Figure 11B:
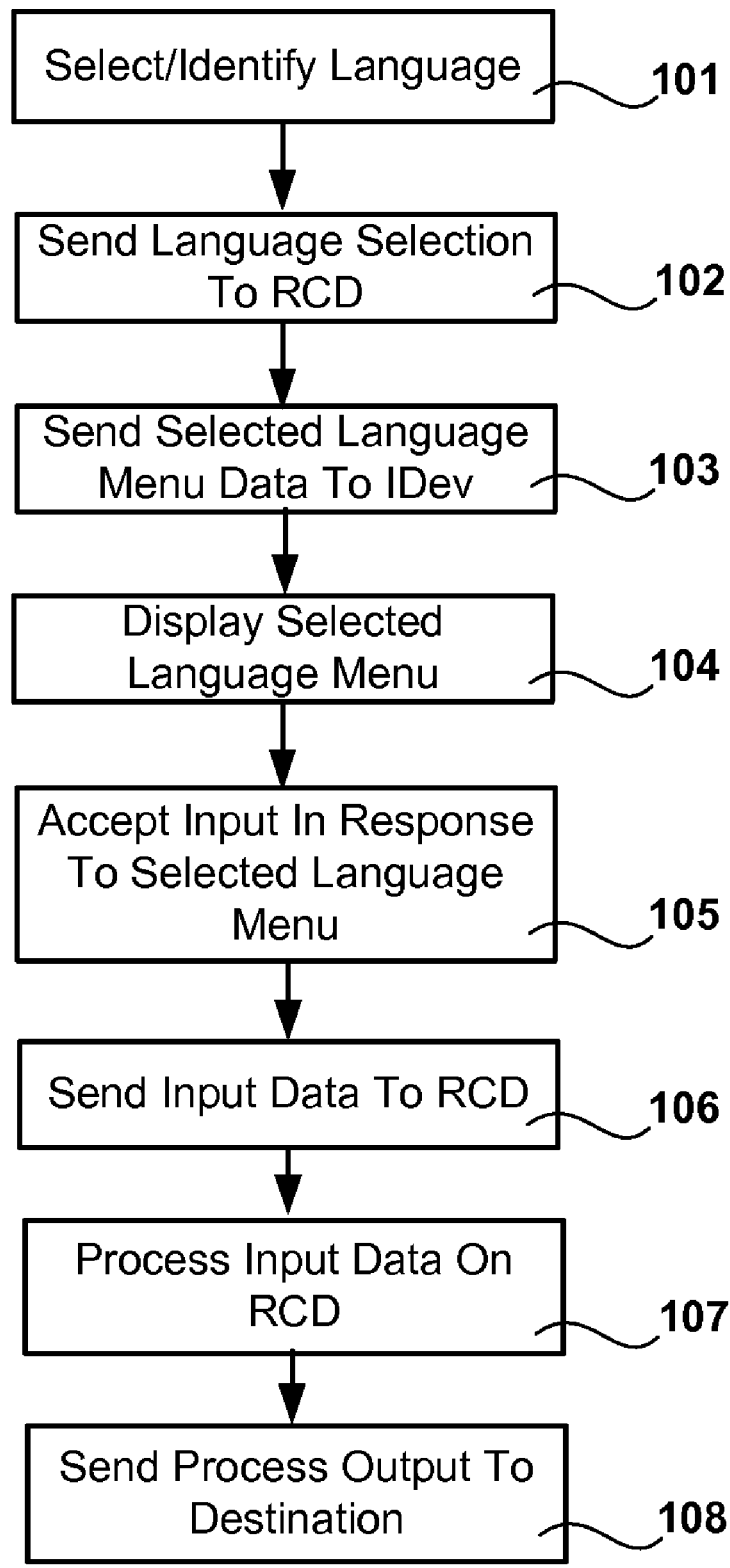
FIG. 11B is a chart showing steps of an embodiment comprising selection of a preferred language.

Some embodiments of the present invention may comprise multi-language menu support. Some of these embodiments, illustrated in FIG. 11B, may allow for an initial selection or identification 101 of a user-preferred language. This selection may comprise user input to select a preferred language. This step may also comprise an automatic identification of a user-preferred language which may be achieved by a user identification profile linked to a language, a language identification based on the text of a scanned document, a code printed on a scanned document or some other identification scheme.

Once the language has been selected, or otherwise identified, the selection/identification data may be sent 102 to an RCD, where the selection may be used to identify language-specific menu data that may be sent 103 to the imaging device for display 104. A user may then respond to the selected-language menu data with input 105, which may be used to invoke native imaging device functions or may be sent 106 to the RCD for any necessary processing. An RCD may then process 107 the input data and may send 108 any process input to a destination, such as the imaging device, an e-mail address, a memory location or some other destination.

Dynamic Forms

Figure 12:
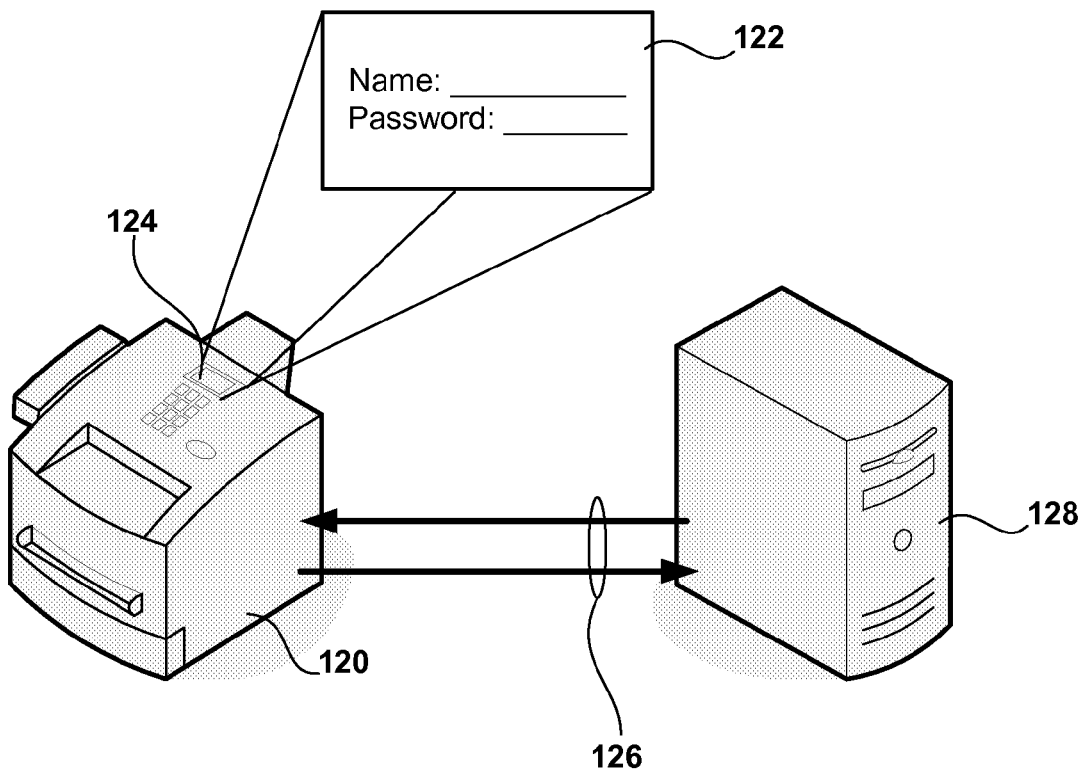
FIG. 12 is a diagram showing elements of a system embodiment of the present invention.

Some embodiments of the present invention may be described with reference to FIG. 12. In these embodiments, an imaging device (IDev) 120 comprises a user interface 124, which may be capable of receiving user input and displaying data to a user. The user interface 124 may comprise a display. An exemplary display comprises a touch panel. The display may be used to display data 122 to a user. This data may comprise menu data to prompt for a user selection or data entry, such as a user ID and password, form selection or some other input. The imaging device 120 may have a communication link 126, which may comprise a typical computer network connection, a serial cable or some other wired or wireless communication link as described in other embodiments. The communication link 126 may connect the imaging device 120 to a remote computing device (RCD) 128, such as a server. The RCD 128 may be used to store documents, such as forms, and other data and make that data accessible from the imaging device 120. The RCD 128 may also execute applications that interact with or receive input from the imaging device 120 and its user interface 124.

The terms "modify" and "modification," as used in this specification in relation to documents, comprise the actions of document generation, document merging functions, document field assignments, search and replace functions, and any other actions that cause a humanly perceptible or machine perceptible change to a document.

The term "document content" or "content," as used in this specification, comprises text, graphics, images, symbols and other data that is intended to be communicated by the document.

The term "user input" or "input," as used in this specification, comprises input of content and instructions for an imaging device, a remote computing device or some other device. Input may be accomplished by keypad entry, touch-screen entry, upload from another device or by other methods.

Figure 13:
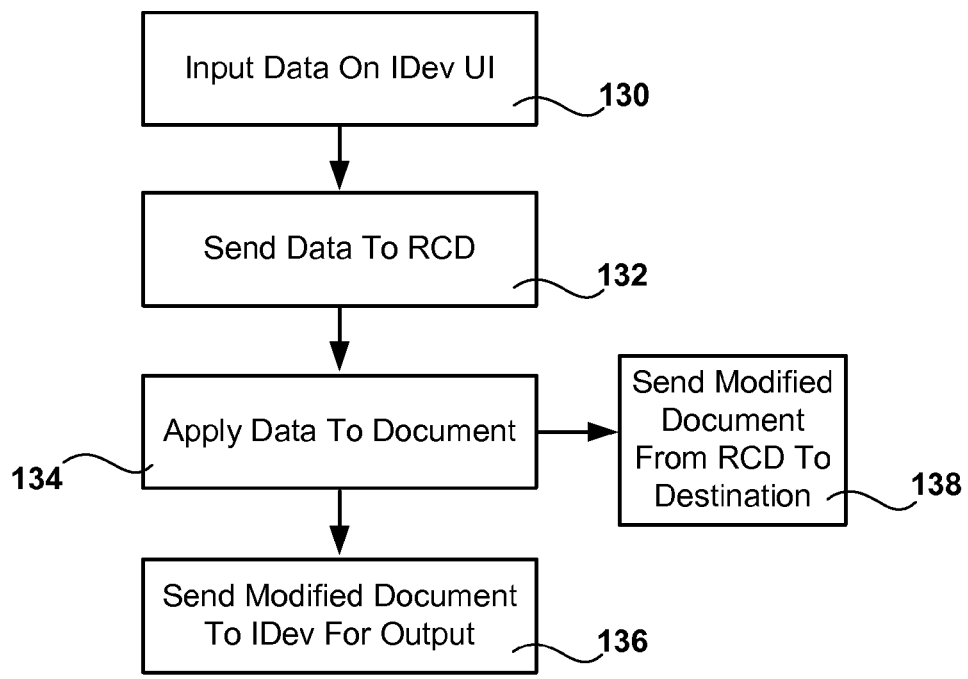
FIG. 13 is a chart showing the steps of an exemplary document modification method.

In some embodiments of the present invention, as illustrated in FIG. 13, user data may be input on the user interface 124 of an imaging device 120. This user data may be then sent 132 over a communication link 126 to an RCD 128. When the data is received at the RCD, the RCD may apply 134 the data to a document. This process may comprise modification 134 of the document, such as filling in the fields of a form, selecting optional portions of a document, addressing a document, formatting a document and other modification procedures. The application 134 of data to a document may also comprise generation of a new document with the user data. This may be performed by an application running on the RCD 128. Once the document has been modified or generated, the document may be sent 138 directly from the RCD 128 to a destination, such as an e-mail address, a fax number, a network location or some other destination. The modified or newly generated document may also be sent 136 to the imaging device 120 for output in some format, such as printed media, fax transmission, e-mail or some other format.

Figure 14:
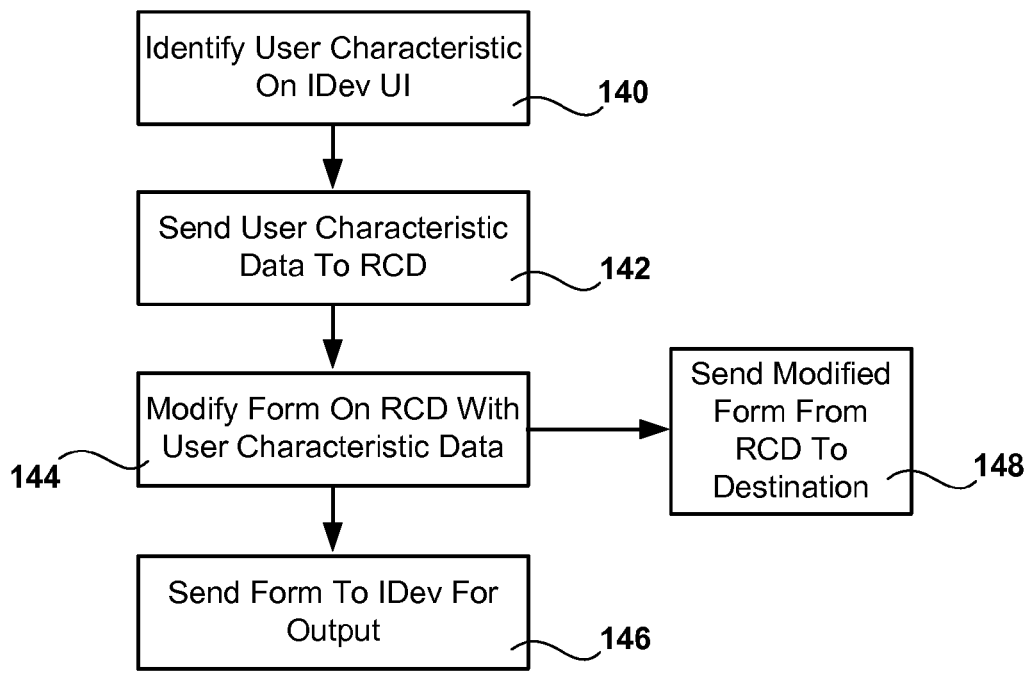
FIG. 14 is a chart showing the steps of an exemplary document modification method using user characteristic data.

Some embodiments of the present invention may be tailored for user characteristic data. These embodiments are illustrated in FIG. 14. In these embodiments, a user may identify 140 specific user characteristic data by input on an imaging device user interface 124. This user characteristic data may comprise a user identification, a user location, a user occupation, a user marital status, a user gender, a user account identifier or some other user characteristics. This user characteristic data may be then sent 142 over a communication link 126 to an RCD 128. When the data is received at the RCD 128, the RCD 128 may modify 144 a document using the data. This process may comprise modification 144 of an existing document, such as filling in the fields of a form, selecting optional portions of a document, addressing a document, formatting a document and other modification procedures. The modification 144 of a document with user characteristic data may also comprise generation of a new document with the user characteristic data. As in other embodiments, this may be performed by an application running on the RCD 128. Once the document has been modified or generated, the document may be sent 148 directly from the RCD 128 to a destination, such as an e-mail address, a fax number, a network location or some other destination. The modified or newly generated document may also be sent 146 to the imaging device 120 for output in some format, such as printed media, fax transmission, e-mail or some other format.

Figure 15:
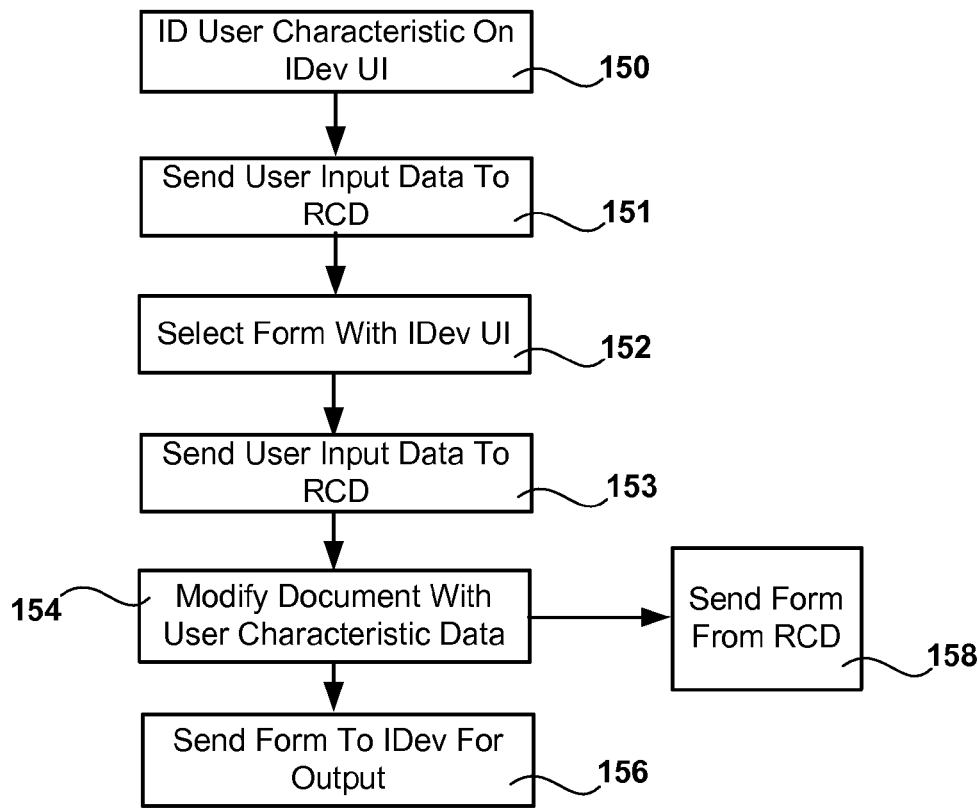
FIG. 15 is a chart showing the steps of an exemplary document modification method comprising user characteristic input and document selection.

Further embodiments of the present invention, illustrated in FIG. 15, also comprise a document selection process. In these embodiments, a user may input 150 user characteristic data or some other data at an imaging device user interface 124, as in other embodiments. This user input data may be optionally sent 151 to an RCD before further input. In these embodiments, a user may further select 152 a document from the imaging device user interface 124. This document selection 152 and any prior input may then be sent 153 to an RCD 128 for processing. These user input steps 150, 152 may be performed in several input steps through menu selections on the imaging device user interface 124. Each step may comprise receiving input, sending the input to the RCD 128 and refreshing the user interface display 124 for subsequent input steps. Menu data may be supplied from the imaging device 120 or from the RCD 128. When all required data has been input and sent to the RCD 128, the RCD 128 may modify 154 the selected document using the user input. After document modification or generation 154, the document may be sent to a destination 158 from the RCD or to the imaging device 120 for further output 156.

Figure 16:
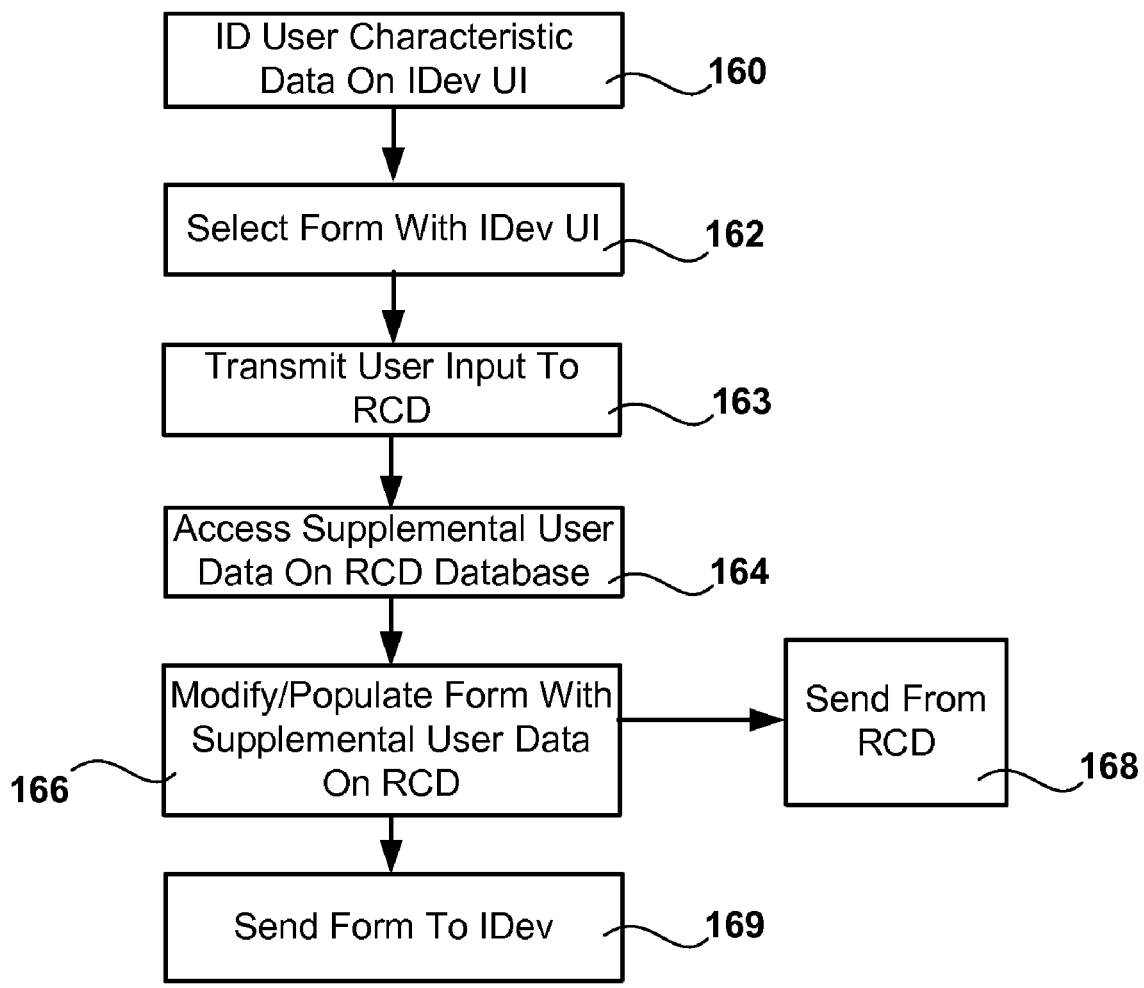
FIG. 16 is a chart showing the steps of an exemplary document modification method wherein supplemental user data is retrieved.

Some embodiments of the present invention comprise database access. These embodiments, illustrated in FIG. 16, may allow user input data receipt 160 at an imaging device user interface 124. Document selection input 162 may be allowed at the user interface 124. This user input may be transmitted 163 to an RCD 128, as in previously described embodiments. However, this user input may be used to identify stored database data that can be accessed 164 for use in document modification. Once the user input data and the supplemental database data is accessed by the RCD 128, the data may be used to modify or generate 166 a document. The document may then be sent to a destination 168 or to the imaging device 169.

Figure 17:
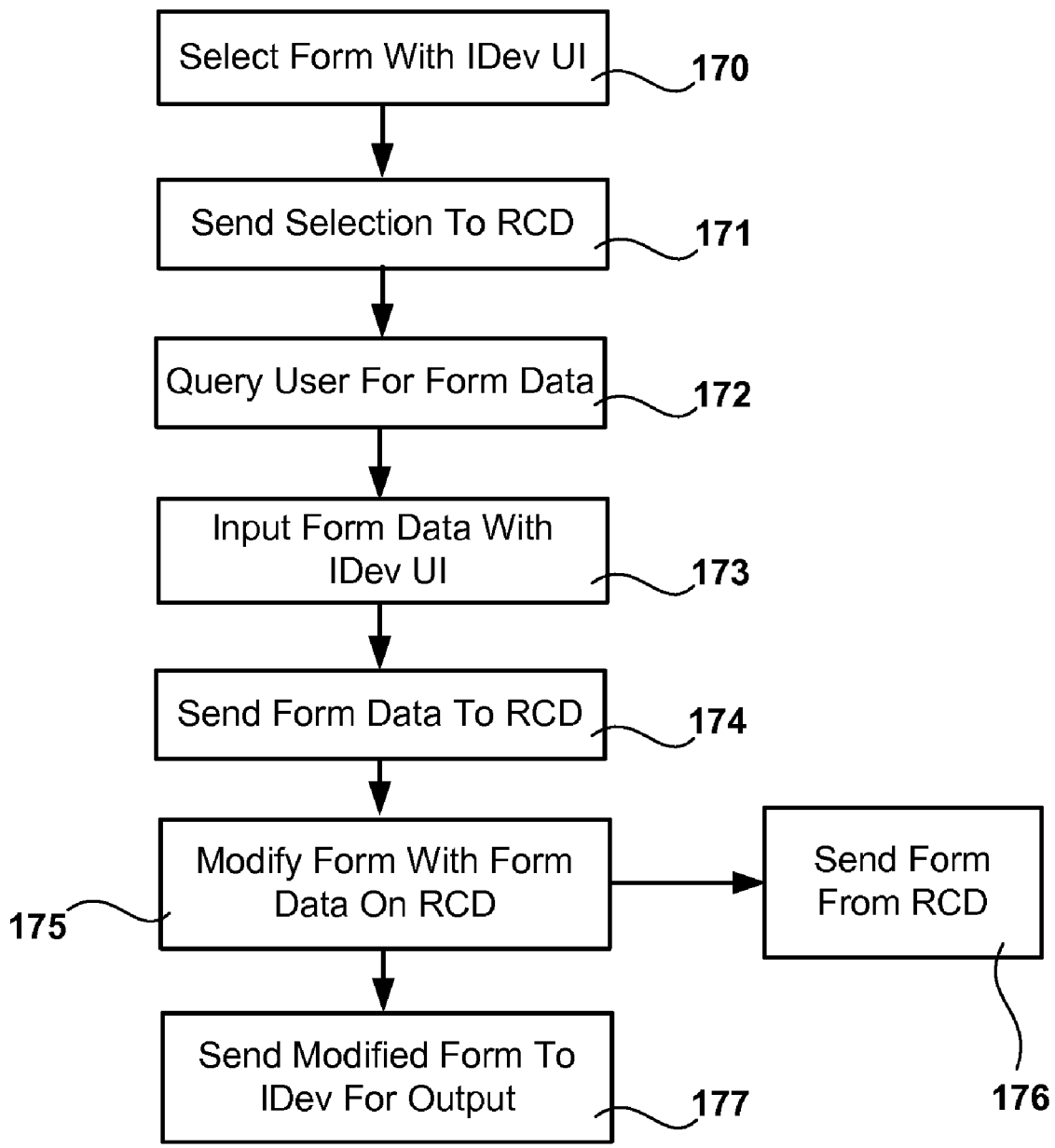
FIG. 17 is a chart showing the steps of an exemplary document modification method comprising a user query.

Further embodiments of the present invention may be described with reference to FIG. 17. These embodiments comprise a user query process. In these embodiments, a user may select 170 a document at an imaging device user interface 124. This selection may be then sent 171 to an RCD 128. The RCD 128 may then determine what information is required to complete the document and may query 172 the user for that specific information through the imaging device user interface 124. Input may be then received 173 on the user interface 124 and may sent 174 to the RCD 128. The selected document may be modified or generated 175 as previously described. Once modified or generated, the document may be sent to a destination 176 or to the imaging device 177 for output or further processing.

Figure 18:
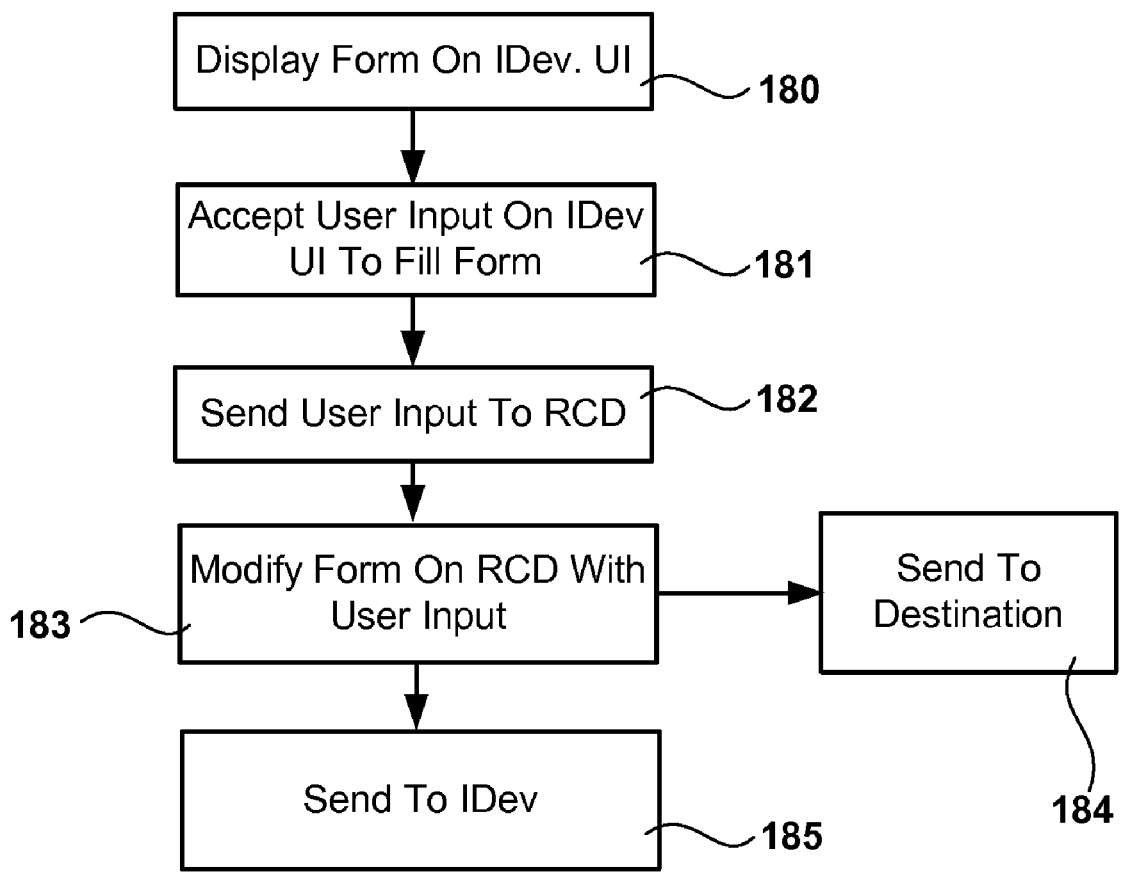
FIG. 18 is a chart showing the steps of an exemplary document modification method comprising document display on an imaging device.

In still more embodiments of the present invention, as illustrated in FIG. 18, a document may be displayed 180 on an imaging device user interface 124. This display 180 may be initiated by user selection, some automated process or by some other selective method. In conjunction with the document display 180, a user may be prompted to input data for document modification, such as filling out a form. User input may be accepted 181 at the user interface 124. This input data may be then sent 182 to an RCD 128 and the document that was displayed may be modified 183 according to the user input received from the user interface 124. As in other embodiments, the modified document may be sent directly to a destination 184 or to the imaging device 120 for output or further processing 185.

Figure 19:
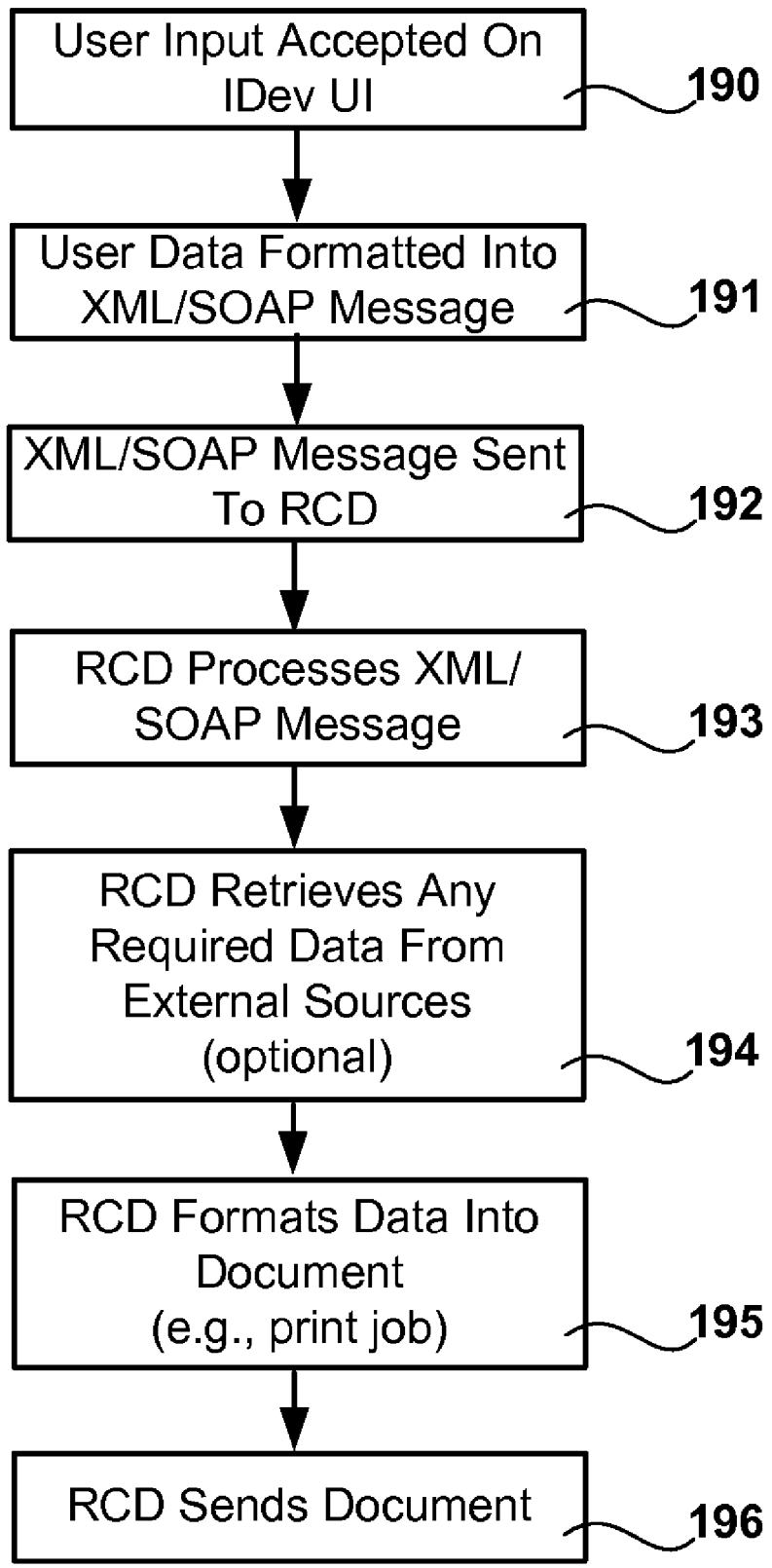
FIG. 19 is a chart showing the steps of an exemplary document modification method using XML and SOAP.

Some embodiments of the present invention, illustrated in FIG. 19, may use a markup language, such as an Extensible Markup Language (XML) and a message protocol such as Simple Object Access Protocol (SOAP). In some exemplary embodiments, a user input may be accepted 190 at an imaging device user interface 124. The input data may be formatted 191 at the imaging device into a SOAP message using XML. The XML/SOAP message may be then sent to an RCD 128 over a communication link 126. The RCD 128 may process 193 the XML/SOAP message entirely or partially and may send parts of the message to other units on a network for processing. Processing of the message may require retrieval 194 of data stored on the RCD 128, another network storage device or from some other location. Once all required data has been retrieved, the data may be formatted 195 into a document, such as a print job or e-mail, and sent 196 to a destination or imaging device 120.

Figure 20:
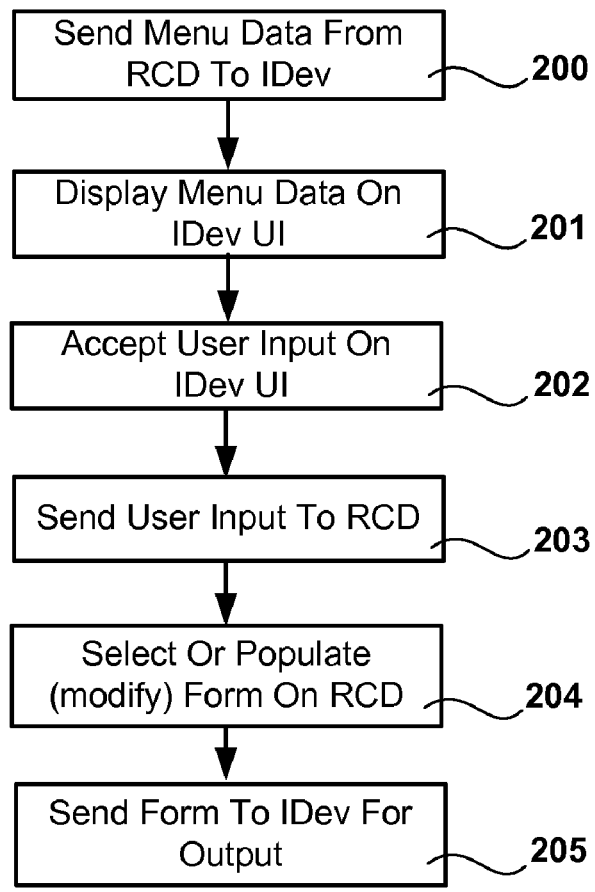
FIG. 20 is a chart showing the steps of an exemplary document modification method comprising remote menu data.

Some embodiments of the present invention, as illustrated in FIG. 20, comprise menu data that may be stored on an RCD 128, but displayed on an imaging device user interface 124. In some of these embodiments, menu data may be sent 200 from an RCD 128 to an imaging device 120. This menu data may be then displayed 201 on the imaging device user interface 124. User input, in response to the menu display, may be accepted 202 at the imaging device user interface 124 and may be sent 203 to the RCD 128 for processing. This input data may be then used at the RCD 128 to select or modify 204 a document that is accessible to the RCD 128. Once the document has been modified, selected or generated, the finalized document may be sent 205 to a destination or to an imaging device 120 for further processing or output.

Figure 21:
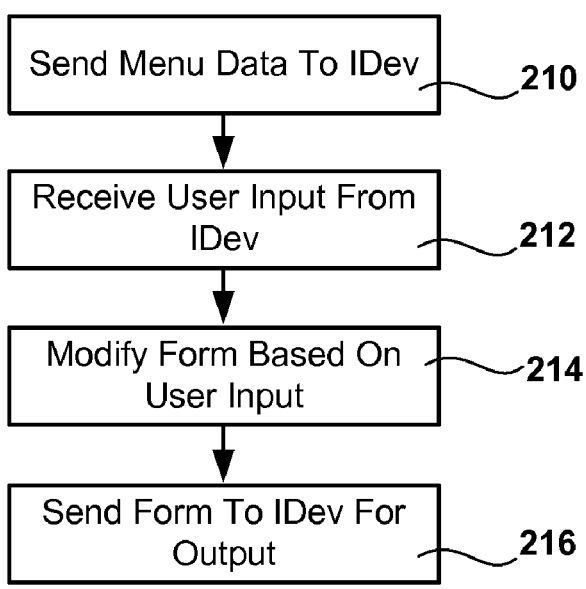
FIG. 21 is a chart showing the steps of an exemplary document modification method executed by an imaging device.

An RCD 128 comprising remote menu data for display on an imaging device 120 may follow a method illustrated in FIG. 21. In these embodiments, the RCD 128 may send 210 menu data to an imaging device 120 for display. The display process may prompt for user input and may relay that input back to the RCD 128, which may receive 212 the input data. This data may then be used to complete, generate, format or otherwise modify 214 a document, which may then be sent 216 to a destination or to an imaging device 120 for further processing or output.

Figure 22:
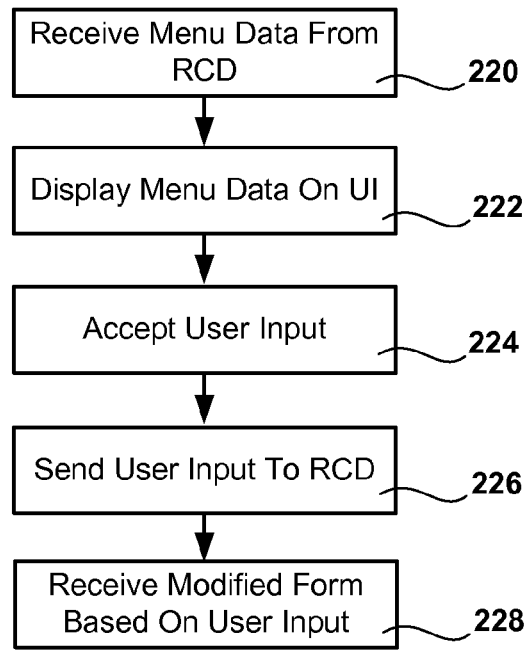
FIG. 22 is a chart showing the steps of an exemplary document modification method executed by a remote computing device.

An imaging device 120 that receives remote menu data may follow a method illustrated in FIG. 22. In these embodiments, the imaging device 120 may receive 220 menu data from an RCD 128. This menu data may be displayed 222 on the imaging device user interface 124. This may be done in a manner that prompts a user for input on the user interface 124. Input may then be accepted 224 on the user interface 124 and may be sent 226 to an RCD 128 for processing. The RCD 128 may then modify a document in response to the user input and may send the modified document to the imaging device 120.

The imaging device 120 may receive 228 the modified document and may send it to a destination or converts it to hard copy output.

Figure 23:
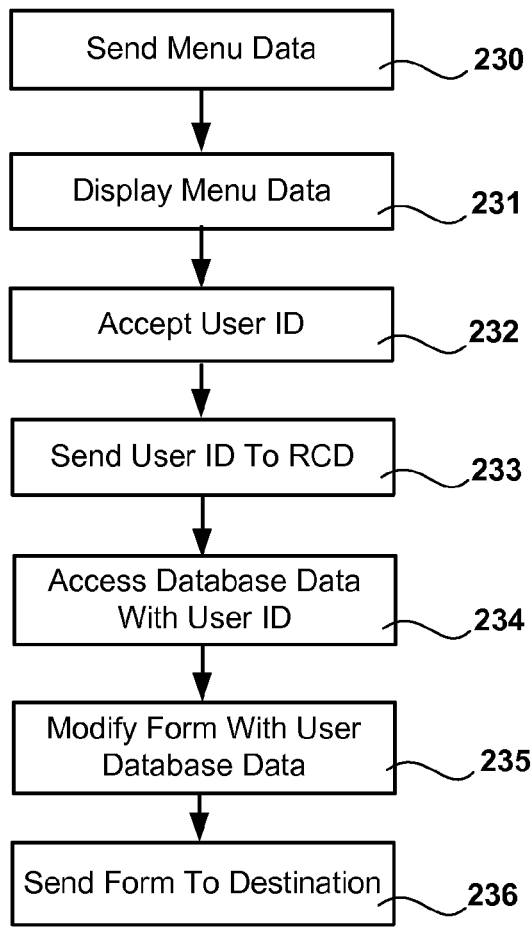
FIG. 23 is a chart showing the steps of an exemplary document modification method executed by an imaging device wherein remote data is accessed.

Further embodiments of the present invention comprising remote menu data may be explained with reference to FIG. 23. These embodiments comprise database or network resource access in conjunction with remote menu data. In some of these embodiments, menu data stored on an RCD 128 may be sent 230 to an imaging device 120 for display. The menu data may be displayed 231 on the imaging device where input may be prompted. User input may be accepted 232 at the imaging device user interface 124 and may be sent 233 to the RCD 128 for processing. Processing on the RCD 128 may call for supplemental data identified during processing. When this is the case, the RCD 128 may access 234 a database or other network resource to obtain the supplemental data. Once all necessary data has been obtained, the RCD 128 may modify 235 a document with the data and send 236 that modified document to the imaging device 120 for further processing or output.

Figure 24:
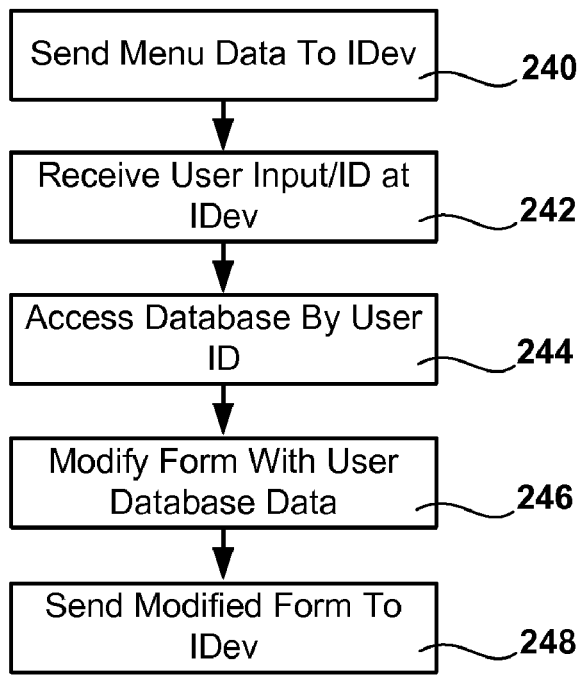
FIG. 24 is a chart showing the steps of an exemplary document modification method executed by a remote computing device wherein remote date is accessed.

An RCD 128 that utilizes remote menu display and data access may follow the steps illustrated in FIG. 24. In these embodiments, menu data may be sent 240 to an imaging device 120 for display on a user interface 124. Data received from the imaging device 120 may be received 242 at the RCD 128. Any supplemental data called for in processing the user input data may be accessed 244 from a database or other network or local resource. The input data and supplemental data may then be used to modify 246 a document, which may then be sent 248 to the imaging device 120 for further processing or output.

Figure 25:
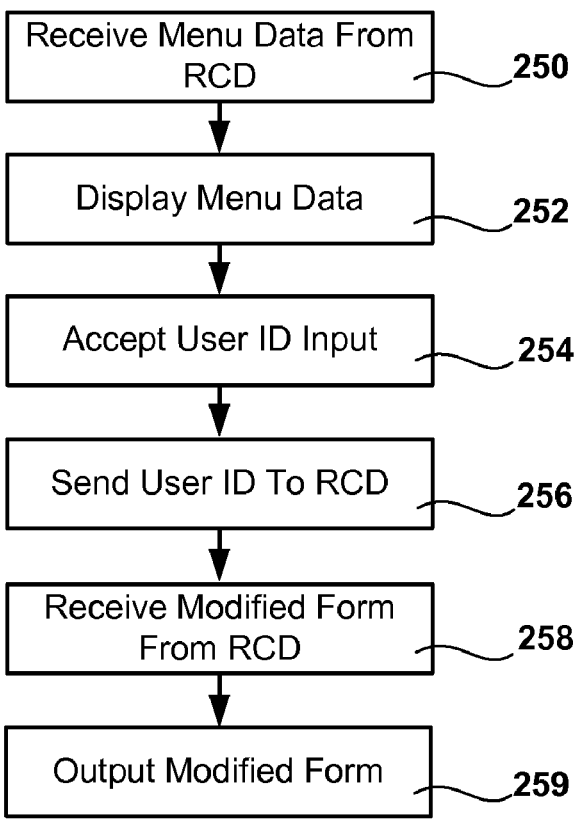
FIG. 25 is a chart showing the steps of an exemplary document modification method comprising remote menu data and remote document modification.

An imaging device that utilizes remote menu data and remote data access may follow the steps illustrated in FIG. 25. In these embodiments, imaging device menu data may be received 250 from an RCD 128 and may be displayed 252 on the imaging device user interface 124. User input may be accepted 254 in response to the display of menu data and may be sent 256 to the RCD 128 for processing. After remote data access and document modification performed by the RCD, a modified document may be received 258 at the imaging device 120 from the RCD 128 and the modified document may be output 259 by the imaging device 120.

Some embodiments of the present invention may operate without the aid of a remote computing device that processes data and/or instructions. Some embodiments, illustrated in FIG. 26, comprise an imaging device (IDev) that does not require a communication link to other devices. The imaging device of these embodiments comprises a user interface with an input device and a display. In these embodiments, document content may be received 260 on the IDev user interface. Other information, such as menu selections, formatting data and other user input may also be received at the user interface. This document content may be used to add to or otherwise modify 262 a document that has been stored on the IDev. Some IDevs of these embodiments comprise data storage capabilities for the storage of forms, documents and other data. In some embodiments, a document may be created from the document content input by the user and no storage capability is required. Once a document has been modified by the user input content, the modified document may be sent 264 to a destination within the imaging device, such as another module of the device, for further processing or transmission or the document may be sent 264 to a destination outside the imaging device through a communication link.

Figure 26:
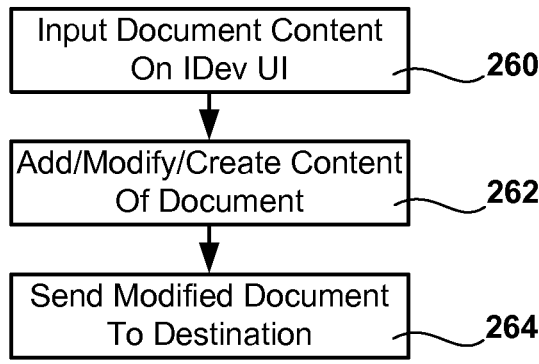
FIG. 26 is a chart showing the steps of an exemplary document modification method comprising document content modification on an imaging device with output to a destination.
Figure 27:
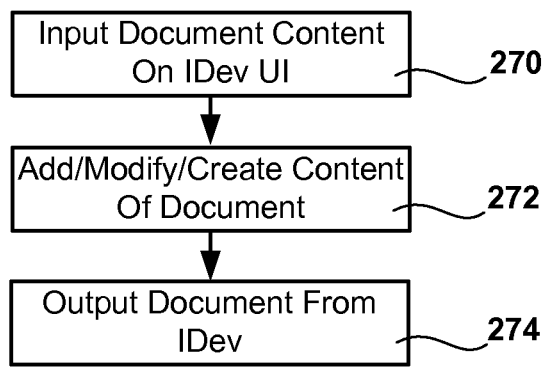
FIG. 27 is a chart showing the steps of an exemplary document modification method comprising document content modification on an imaging device with document output through an imaging device function.

Further embodiments of the present invention, illustrated in FIG. 27, are similar to those explained with reference to FIG. 26. These embodiments may receive 270 input of document content at an imaging device user interface. This content may be used to add to or modify 272 (including creation of) a document's content. Once the document has been modified, the document may be output 274 using one of the imaging device imaging functions, such as, but not limited to, printing on media, transmitting as e-mail, transmitting as a facsimile and other output formats.

Figure 28:
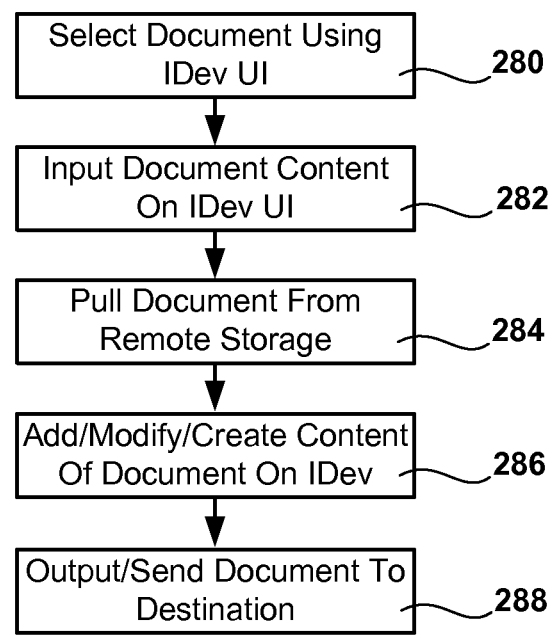
FIG. 28 is a chart showing the steps of an exemplary document modification method comprising document content modification on an imaging device with remote document storage.

Some embodiments of the present invention may be described in relation to FIG. 28. These embodiments of the present invention may provide for document modification (including creation) on the imaging device. These embodiments may modify a document on the imaging device, however documents are stored remotely. In these embodiments, a user may select 280 a document using the IDev user interface. The user may also input 282 document content using the IDev user interface. When a document is selected, the document may be pulled 284 from remote storage such as a network server, a remote computing device or some other storage device or location. When the document is retrieved by the IDev, the IDev may modify 286 the document using the input document content. Once the document is modified using the new content, the modified document may be output 288 at the imaging device or sent to another destination.

Embodiments of the present invention that provide for document modification on the imaging device may use one or more Java-based applications that run on the imaging device.

Document Assembly

Some embodiments of the present invention may be described with reference to FIG. 29. In these embodiments, an imaging device (IDev) 290 may comprise a user interface 292, 293, which may be capable of receiving user input and displaying data to a user. The user interface 292, 293 may comprise a display 292. An exemplary display may comprise a touch panel. The imaging device 290 may have a communication link 294, which may comprise a computer network connection, a serial cable or some other wired or wireless communication link as described in other embodiments. The communication link 294 may connect the imaging device 290 to a remote computing device (RCD) 296, such as a server or a personal computer. The RCD 296 may be used to store documents, such as forms and examinations, and other data. The RCD 296 may also execute applications that interact with, or receive, input from the imaging device 290 and its user interface 292, 293. The IDev display 292 may be used to display data 298 to a user. This data may comprise menu data to prompt for a user selection or data entry, such as a user identification and password, menu selection or some other input.

The terms "modify" and "modification," as used in this specification in relation to documents, comprise the actions of document generation, document merging functions, document field assignments, search and replace functions, and any other actions that cause a humanly perceptible or machine perceptible change to a document.

The term "document content" or "content," as used in this specification, comprises text, graphics, images, symbols and other data that is intended to be communicated by the document.

The term "user input" or "input," as used in this specification, comprises input of content and instructions for an imaging device, a remote computing device or some other device. Input may be accomplished by keypad entry, touch-screen entry, upload from another device or by other methods.

Figure 30:
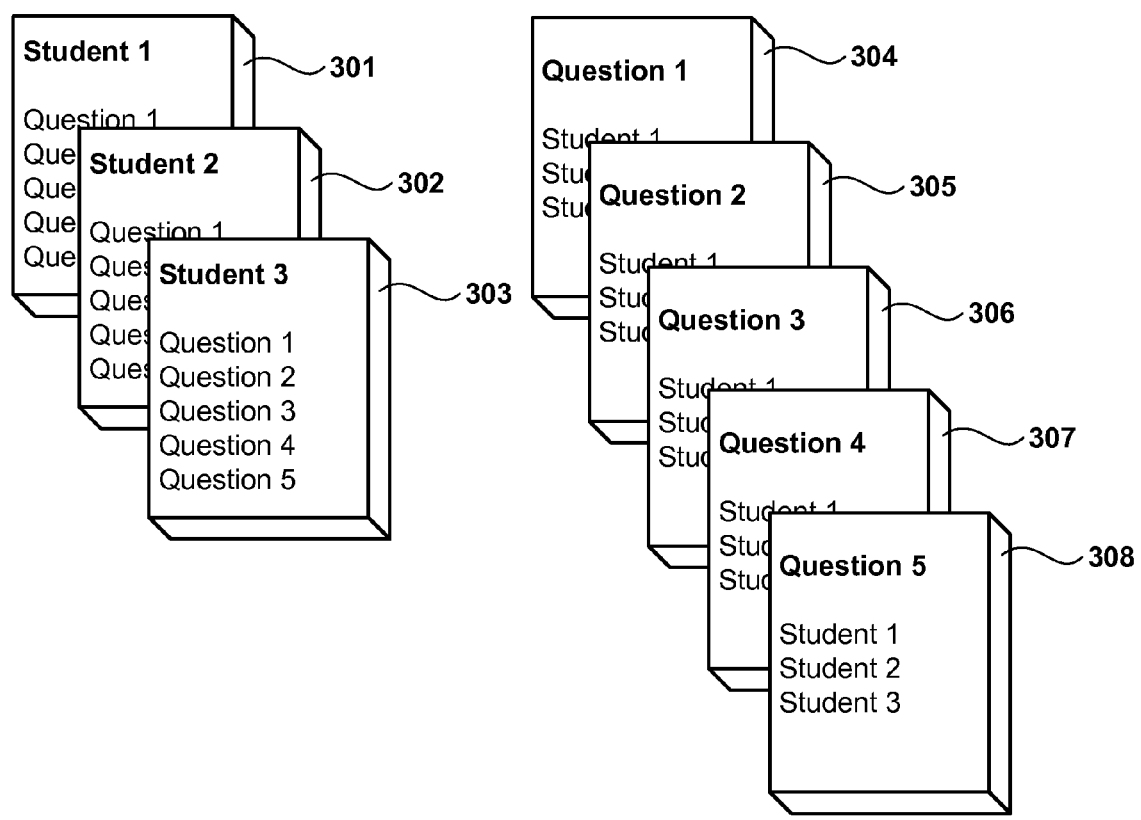
FIG. 30 is a diagram showing an exemplary document reconfiguration.
Figure 31:
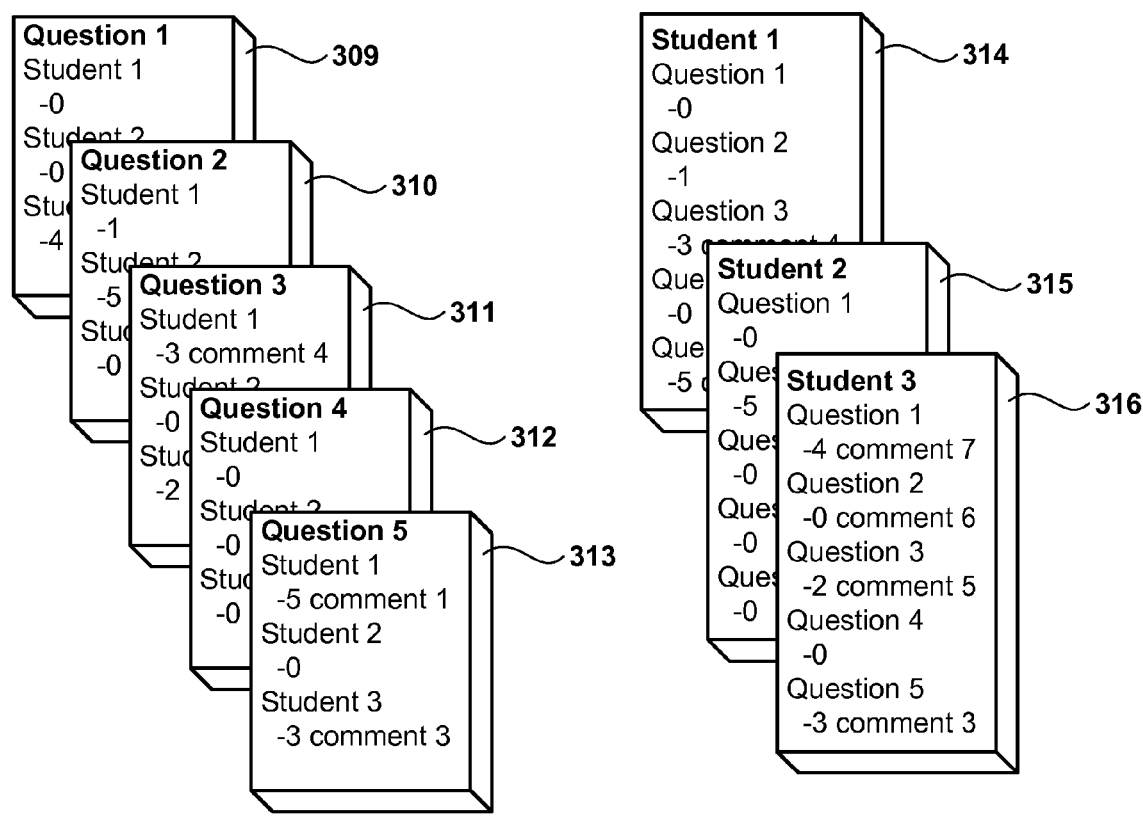
FIG. 31 is a diagram showing an exemplary document reconfiguration.

Some embodiments of the present invention may comprise systems, methods and devices for disassembly of input documents and reassembly of new documents from the disassembled input documents. These embodiments may be illustrated in an exemplary situation as depicted in FIG. 30 and FIG. 31. In this exemplary scenario, it may be more efficient to grade an examination by question as opposed to by student. Therefore, it may be desirable to disassemble a plurality of student examination documents 301-303 by question and reassemble the disassembled documents into a plurality of question-based documents wherein each question-based document 304-308 may comprise the answer of each student to a question. Further, the question-based documents 204-308 may be modified in a grading, or marking process, which may be manual or electronic, and modified, question-based documents, or graded, question-based documents, 309-313 may be generated. Embodiments of the present invention, may disassembled the graded, question-based documents 309-313 and reassembled them into modified, student-based examination documents 314-316 comprising graded examinations.

Another example of document disassembly and reassembly may comprise disassembling responses collected on a survey form or forms into a summary document for each survey question.

Figure 29:
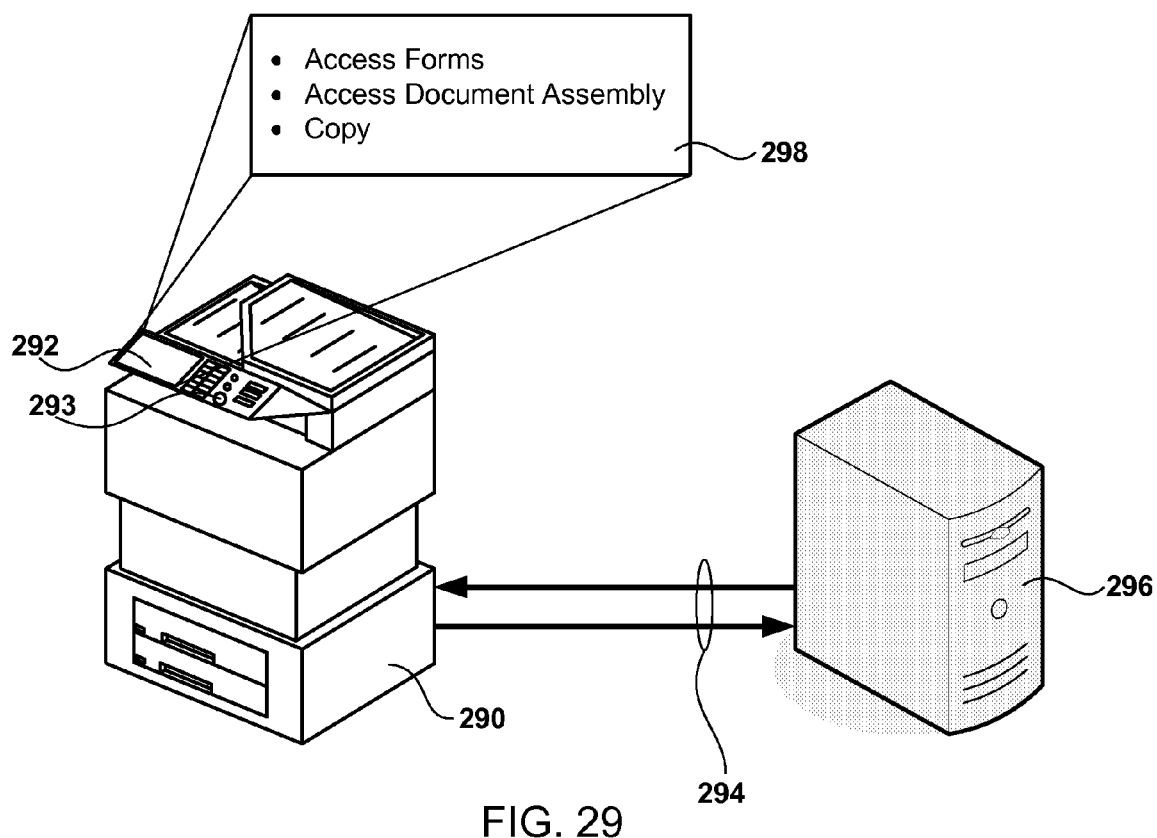
FIG. 29 is a diagram showing elements of an exemplary system embodiment of the present invention.
Figure 32:
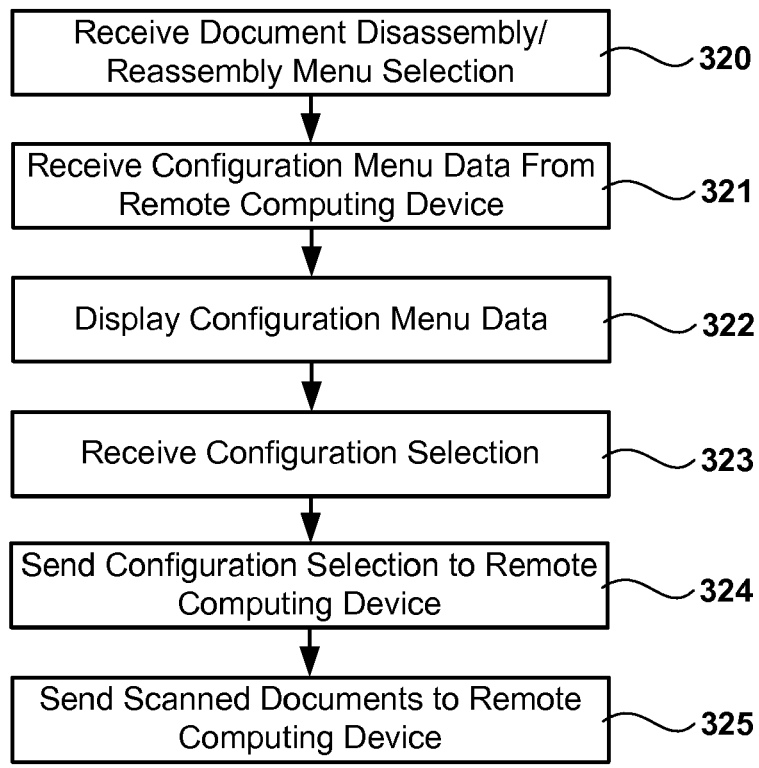
FIG. 32 is a chart showing the steps of an exemplary document reassembly method on an imaging device.
Figure 33:
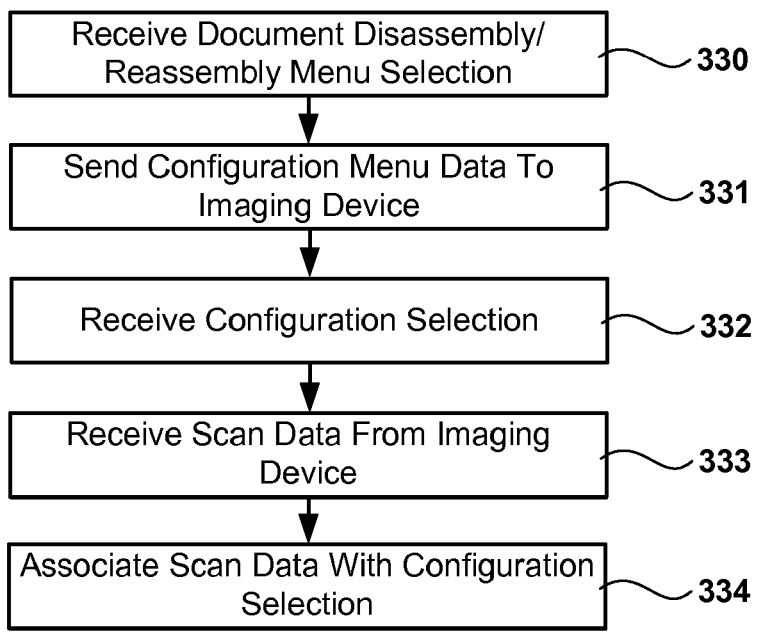
FIG. 33 is a chart showing the steps of an exemplary document reassembly method on a remote computing device.

Some embodiments of the present invention may be illustrated in relation to FIG. 29, FIG. 32 and FIG. 33. In these embodiments, an imaging device 290 may receive 320 through a user interface 293 a selection of a menu 298 item presented on a display 292. The menu item may correspond to a document assembly application running on a remote computing device 296 that is communicatively coupled 294 to the imaging device 290. Upon receipt 330 of the document assembly menu selection from the imaging device 290, the remote computing device 296 may send 331 to the imaging device 290 menu data comprising a list of disassembly/reassembly configurations. In the exemplary scenario described above, the disassembly/reassembly configurations may correspond to examinations. In some embodiments, a disassembly/reassembly configuration may be a document map defining regions of interest in the document. Upon receipt of the menu data 321, the imaging device 290 may display 322 the menu data on the user interface display 292 to prompt a user selection of a disassembly/reassembly configuration. The imaging device 290 may receive 323 a configuration through the user interface 392 and may send 324 the configuration selection to the remote computing device 296. The imaging device 290 may then receive scanned documents and may send 325 the scanned documents to the remote computing device 296. The remote computing device 296 may receive 332 the configuration selection and may receive 333 the scan data from the imaging device 290 and associate 334 the configuration selection with the scan data.

Figure 34:
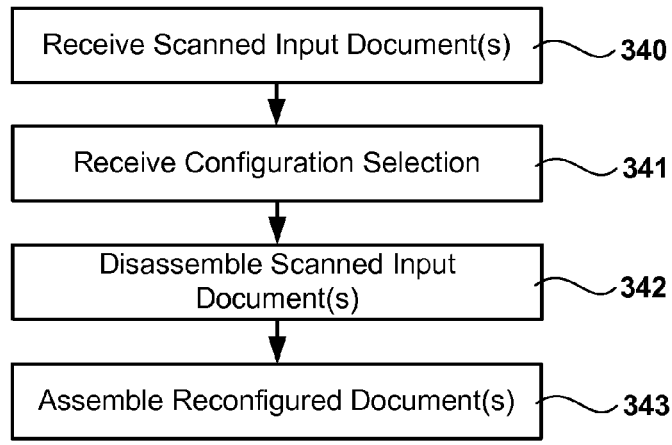
FIG. 34 is a chart showing the steps of an exemplary document reassembly method on a remote computing device.
Figure 35:
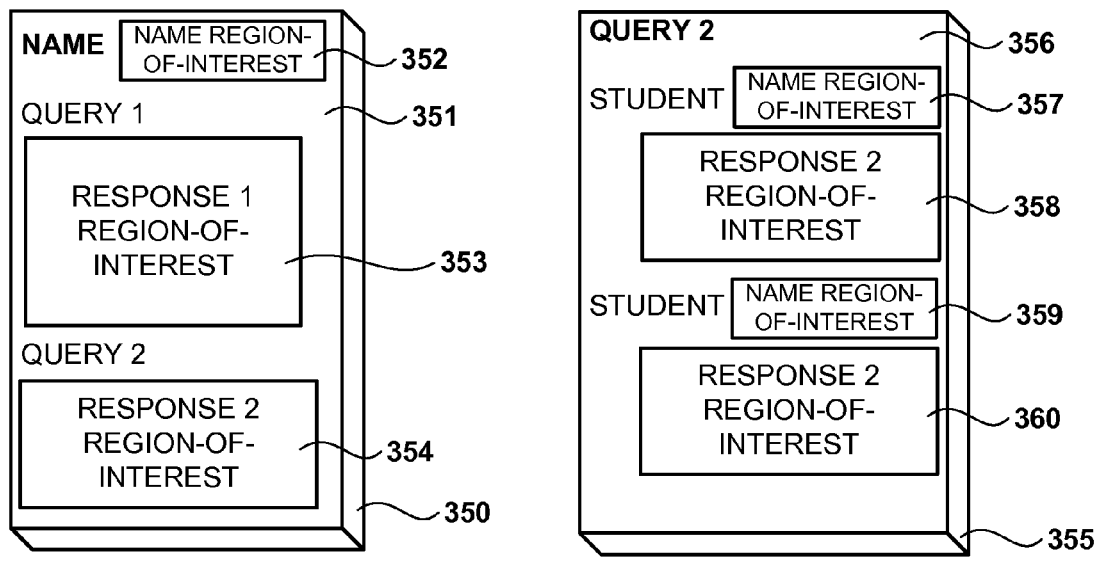
FIG. 35 is a diagram showing an exemplary document template and reconfiguration.
Figure 36:
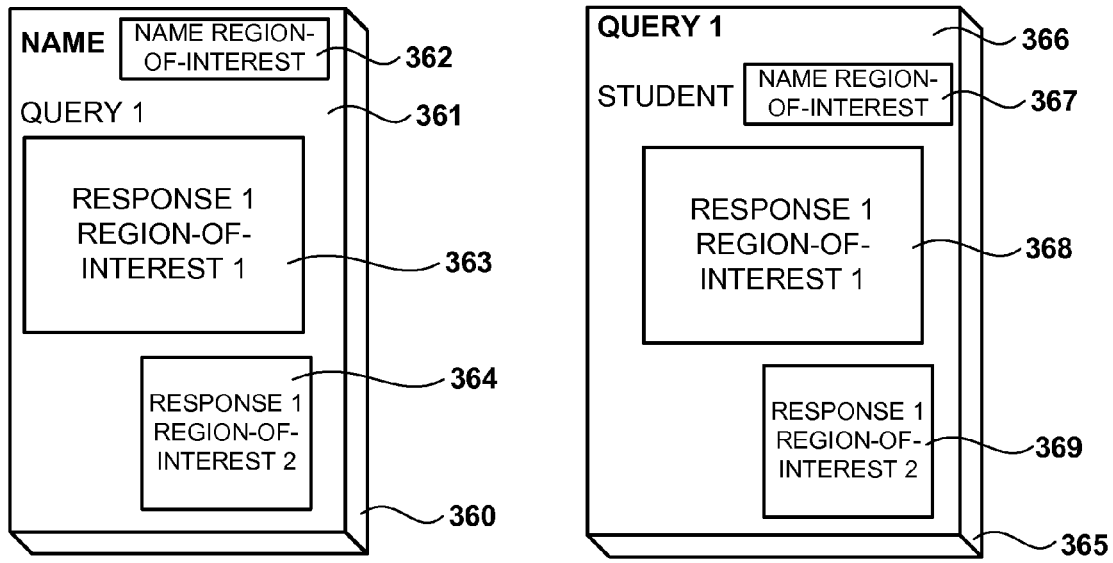
FIG. 36 is a diagram showing an exemplary document template and reconfiguration comprising multiple response regions.

In some embodiments of the present invention described in relation to FIG. 34, the remote computing device 296 may receive 340 a scanned input document or documents and may receive 341 a configuration selection. The remote computing device 296 may disassemble 342 the scanned input document or documents and from the disassembled input document or documents, assemble 343 a reconfigured document. In some embodiments of the present invention, the disassembly/reconfigure application on the remote computing device 296 may use a predefined or preconfigured template to separate the incoming input documents. In some embodiments, a region of interest as defined in the template may be extracted from each input incoming input document and concatenated together into a single reconfigured document. FIG. 35 depicts an exemplary page 351 in an exemplary document template 350. The document page 351 may comprise regions of interest 352-354 defined, for example, by a bounding box. For this example, one region 352 may correspond to the area in which a student may write their name on the examination. Other regions 353, 354 in this example may correspond to the area in which a student may write their response to an examination question. An exemplary reconfigured document 355 may comprise the responses of all students to an examination question (question 2 in the example shown in FIG. 35). An exemplary page 356 of a reconfigured document 355 may comprise the name of a first student 357 and that student's response 358 to the question. The page 356 may further comprise the name of a second student 359 and that student's response 360 to the question. The document 355 may comprise the responses as found on all of the scan documents or a subset as defined by the template. In alternative embodiments, a template may define multiple regions associated with a reconfigured document as shown in an exemplary configuration depicted in FIG. 36. In these embodiments, a document template 360 may associate multiple regions 363, 364 together such that a reconfigured document 365 may comprise concatenation 368, 369 of these multiple regions.

Figure 37:
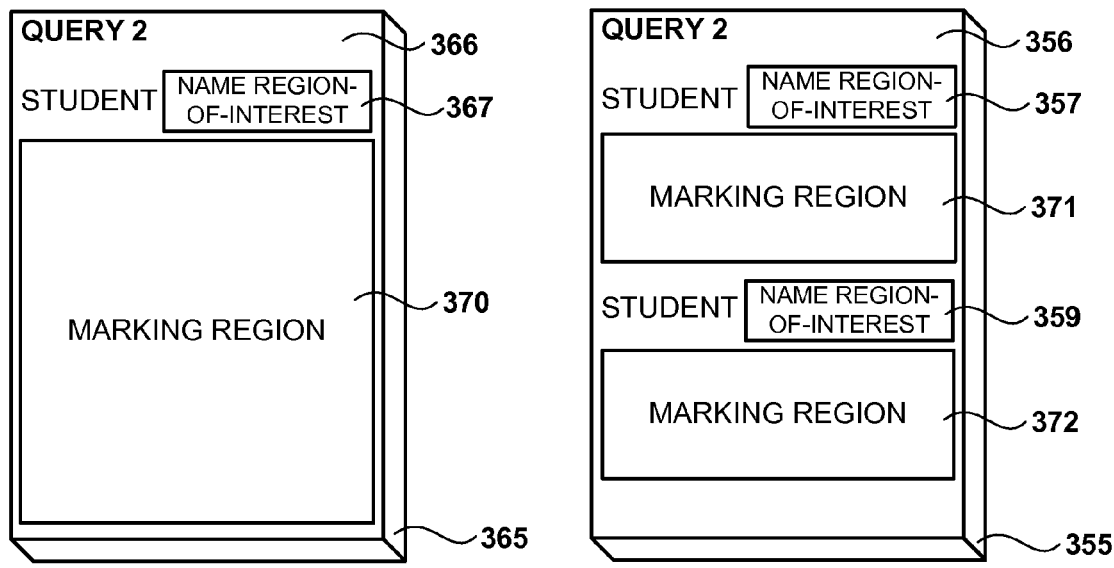
FIG. 37 is diagram showing an exemplary document template comprising marking regions.

In some embodiments of the present invention, a document template or map may further comprise marking or modification regions in the reconfigured document. These regions may be defined, for example, by a bounding box. FIG. 37 shows exemplary marking regions 370-372 for the document templates 355, 365 shown in FIG. 35 and FIG. 36.

Figure 38:
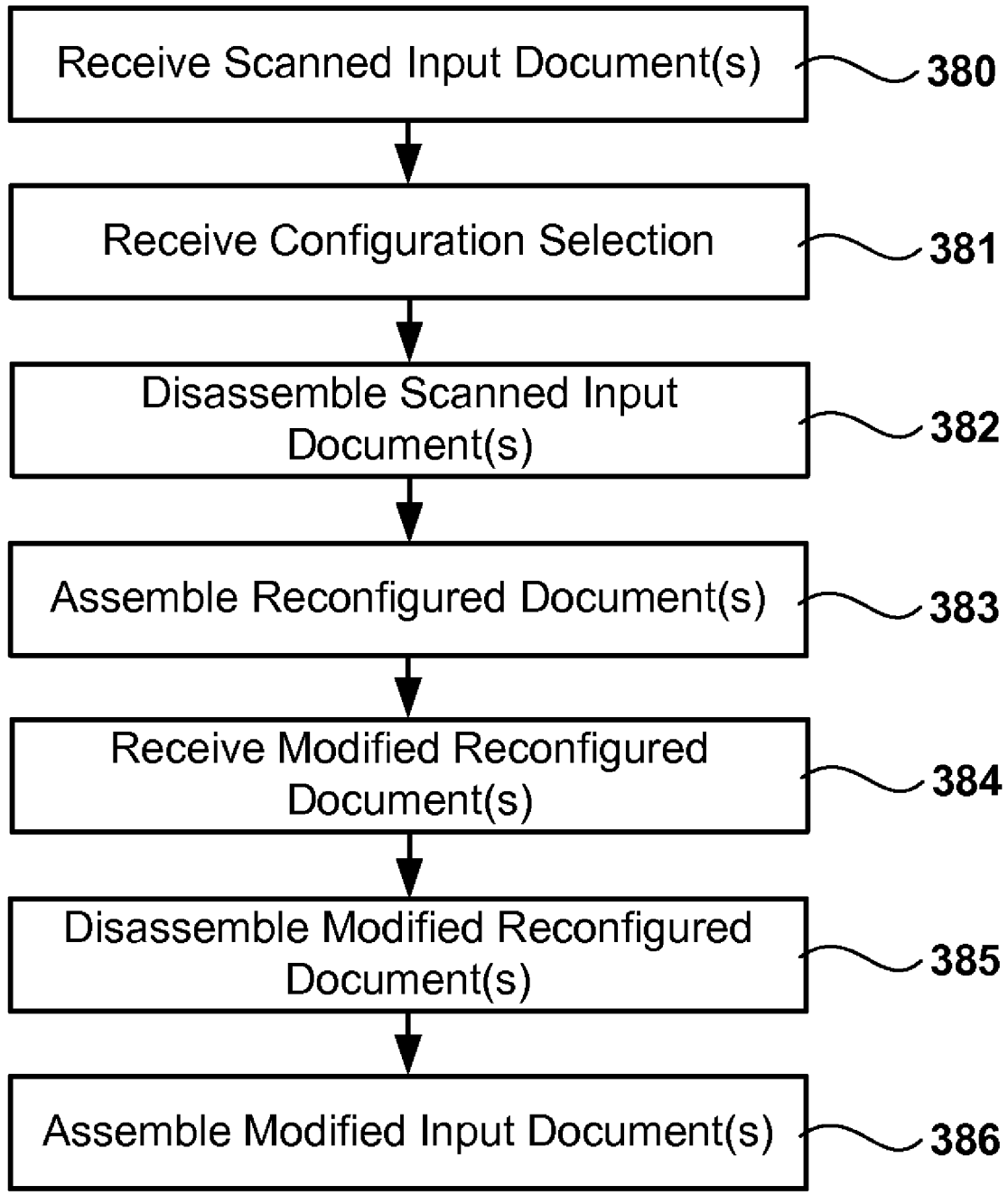
FIG. 38 is a chart showing the steps of an exemplary document reassembly method comprising document modification and subsequent reassembly comprising the modified documents.

Some embodiments of the present invention may be described in relation to FIG. 38. A remote computing device 296 may receive 380 a scanned input document or documents from an imaging device 290. The remote computing device 296 may also receive 381 a configuration selection from the imaging device 290. The remote computing device 296 may disassemble 382 the input document or documents according to a document template or map associated with the configuration selection. The document template or map may be stored in some embodiments on the remote computing device 296. In alternative embodiments, the document template or map may be stored remote to the remote computing device 296. The remote computing device 296 may assemble 383 a reconfigured document or documents according to the document template or map. The remote computing device 296 may receive 384 documents comprising modifications on the reconfigured documents. The modified documents may be disassembled 385 and assembled 386 into modified input documents according to the document template marking regions. In some embodiments, the assembled, reconfigured documents may be sent to the imaging device for printing. In alternative embodiments, the assembled reconfigured documents may be communicated via electronic mail (email), FTP or otherwise sent to a list of recipients defined and associated with the document template or map. In some embodiments, the assembled modified input documents may be sent to the imaging device for printing. In alternative embodiments, the assembled modified input documents may be communicated via email, FTP or otherwise sent to a list of recipients defined and associated with the document template or map.

In some embodiments of the present invention, the document map or template may comprise metadata associated with the regions of interest from which a reconfigured document or documents may be generated. Exemplary metadata may comprise a recipient or recipients to whom the corresponding reconfigured document may be sent, instructions to the recipient or recipients of the reconfigured document (for the examination example, for example, the number of points assigned to the question, the level of difficulty, or other grading or scoring instructions). In some embodiments, the metadata may comprise content which may be included in each assembled modified input document (for the examination example, for example, this may comprise an explanation of the correct solution to the problem, an explanation of the grading policy or other generic information that may be included on each modified input document). In some embodiments of the present invention, the document map, or template, may comprise regions of interest for disassembly of input documents, mappings for reconfiguration and generation of reconfigured documents, regions of interest for modifications for disassembly of modified, reconfigured documents, and mappings for generation of modified, input documents.

Figure 39:
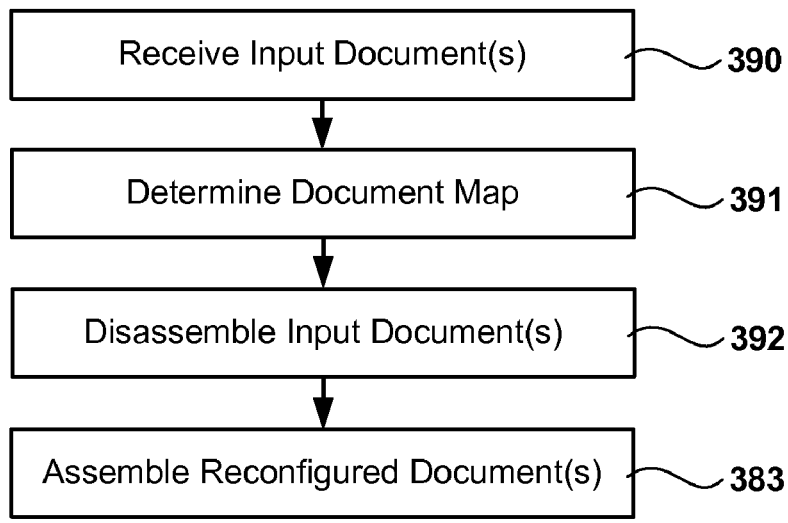
FIG. 39 is a chart showing the steps of an exemplary document disassembly/reassembly method embodiment.

Some embodiments of the present invention may be described in relation to FIG. 39. A computing device may receive 390 an input document or documents. Input documents may come from exemplary sources comprising a scanner, another computing device, an imaging device, a document generation application within the computing device and other sources. The computing device may determine 391 a document map. Exemplary methods for determining the document map may comprise receiving a document map identifier from a remote device (e.g., computing, imaging or storage) and retrieving the identified document map from local or remote storage, receiving the document map from a remote device (e.g., computing or imaging or storage), querying for a document map selection and retrieving the selected document map from local or remote storage, running an application to prompt a user to generate the document map and other methods. The computing device may disassemble 392 the input document or documents according to the determined document map, also considered document template. The document template or map may be stored in some embodiments on the computing device. In alternative embodiments, the document template or map may be stored remote to the computing device. The remote computing device may assemble 393 a reconfigured document or documents according to the document template or map. In some embodiments, the assembled, reconfigured documents may be sent to an imaging device for printing. In alternative embodiments, the assembled reconfigured documents may be communicated via electronic mail (email), FTP or otherwise sent to a list of recipients defined and associated with the document template or map.

Figure 40:
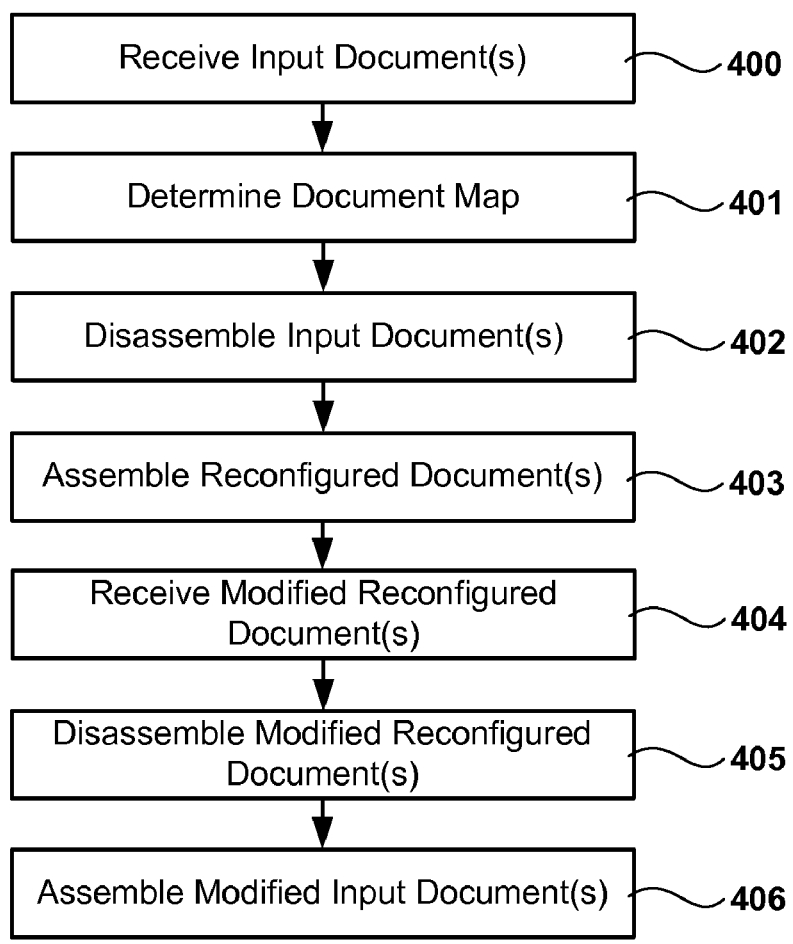
FIG. 40 is a chart showing the steps of an exemplary document reassembly method comprising document modification and subsequent reassembly comprising the modified documents.

Some embodiments of the present invention may be described in relation to FIG. 40. A computing device may receive 400 an input document or documents. Input documents may come from exemplary sources comprising a scanner, another computing device, an imaging device, a document generation application within the computing device and other sources. The computing device may determine 401 a document map. Exemplary methods for determining the document map may comprise receiving a document map identifier from a remote device (e.g., computing, imaging or storage) and retrieving the identified document map from local or remote storage, receiving the document map from a remote device (e.g., computing or imaging or storage), querying for a document map selection and retrieving the selected document map from local or remote storage, running an application to prompt a user to generate the document map and other methods. The computing device may disassemble 402 the input document or documents according to the determined document map, also considered document template. The document template or map may be stored in some embodiments on the computing device. In alternative embodiments, the document template or map may be stored remote to the computing device. The remote computing device may assemble 403 a reconfigured document or documents according to the document template or map. In some embodiments, the assembled, reconfigured documents may be sent to an imaging device for printing. In alternative embodiments, the assembled reconfigured documents may be communicated via electronic mail (email), FTP or otherwise sent to a list of recipients defined and associated with the document template or map. The computing device may receive 404 documents comprising modifications on the reconfigured documents. The modified documents may be disassembled 405 and assembled 406 into modified input documents according to the document template marking regions. In some embodiments, the assembled modified input documents may be sent to the imaging device for printing. In alternative embodiments, the assembled modified input documents may be communicated via email, FTP or otherwise sent to a list of recipients defined and associated with the document template or map.

Some embodiments of the present invention may be described in relation to the following exemplary application, which is described for illustration and not by way of limitation.

Step 1: Configure an Examination

A teacher may prepare an examination using any method by which a hard copy of the examination may be generated. The teacher may scan the hard copy of the examination into an imaging device selecting a document configuration application residing on a remote computing device as the destination for the scan data. The teacher may then use the document configuration application to identify each region of the scanned examination document that will contain answers to be graded. Exemplary methods by which the regions may be identified may comprise a bounding box tool, a lasso tool or other methods for indicating regions in documents. In some embodiments, the configuration application may also allow the teacher to input metadata, to define the association of the region with a reconfigured document and other information that may be included in a reconfigured document. The document configuration application may generate a document map or template for generating a new document or documents from the examination.

Step 2: Students Complete the Examination

Students may be given the examination with instructions to mark their answers within defined regions associated with each test question.

Step 3: Prepare Examinations for Scoring by Disassembly

The teacher may scan the completed examinations into an imaging device, not necessarily the same imaging device as used for scanning the examination for configuration, identifying the scan destination as the examination configured in the previous step. An application residing on the imaging device associates the current scan job with the configured examination and scans the exams. In some embodiments, the imaging device may receive user input through a user input device on the imaging device indicating a boundary in the scan job between individual examination documents. Exemplary methods by which this may be indicated comprise entering the number of pages per examination at the beginning of the scan job, pressing a "start" key at the beginning of each examination document scan, pressing an "end" key at the end of each examination document scan, pressing a "start" key and an "end" key or any other method.

Step 4: Application Disassembles by-Student Examinations and Generates Reconfigured by-Question Examinations The complete scan job comprising the scanned by-student examination documents may be processed by the remote computing device application. The by-student examination documents may be separated into separate image files for each examination question according to the configuration. An image file may contain additional content based on the document map or template. Exemplary content may comprise header information identifying the question, grading instructions, date and formatting content such as that indicating the student name. The image file may also indicate a reserved region in which the grading teacher must confine their markings of a response. In some embodiments, the by-question image files representing the by-question documents, may be sent to an imaging device for printing, not necessarily the same imaging device as used for scanning the examination for configuration. In alternative embodiments, the by-question documents may be sent via email, ftp, fax or other communication methods to intended recipients.

Step 5: Graders Score Examinations

One or more teachers grade the questions. Scoring may be performed on hard copy by-question documents or on softcopy by-question documents, for example using a tablet PC or other electronic entry methods. In some embodiments, a teacher may scan the graded examinations into an imaging device, not necessarily the same imaging device as used for scanning the examination for configuration, identifying the scan destination as the examination configured in the previous step. An application residing on the imaging device associates the current scan job with the configured examination and scans the graded exams. In some embodiments, the imaging device may receive user input through a user input device on the imaging device indicating a boundary in the scan job between individual examination documents. Exemplary methods by which this may be indicated comprise entering the number of pages per examination at the beginning of the scan job, pressing a "start" key at the beginning of each examination document scan, pressing an "end" key at the end of each examination document scan, pressing a "start" key and an "end" key or any other method.

Step 6: Graded Questions are Reassembled into Student Examinations

The complete scan job comprising the scanned, graded exams may be processed by the remote computing device application. The graded, by-question documents may be separated into separate image files for each student according to the configuration. An image file may contain additional content based on the document map or template. Exemplary content may comprise header information identifying the question, general grading information. Exemplary general grading information may comprise the accepted, correct answers, the relative weighting of the exam questions, the name of the graders, instructions to the students for resolution of grading disputes and other information. In some embodiments, the graded, by-student image files representing the graded, by-student documents, may be sent to an imaging device for printing, not necessarily the same imaging device as used for other portions of the process. In alternative embodiments, the graded, by-student document files may be sent via email, ftp, fax or other communication methods to intended recipients.

Some embodiments of the present invention may comprise performing optical character recognition (OCR) on portions of the modified, reconfigured documents. Some embodiments may further comprise generating information summaries based on the reconfigured documents or modified, reconfigured documents. In some embodiments, information summaries may comprise statistical analysis. In the exemplary scenario of student examinations, OCR may be performed on the examination scores and a grading report may be generated. The grading report may comprise statistical analysis of the examination scores.

In some embodiments of the present invention that provide for document reconfiguration, disassembly and reassembly on the imaging device, one or more applications may run on the imaging device.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for document manipulation, said method comprising:
   receiving, at a computing device, a first input document comprising first document content in a first region-of-interest and a second input document comprising second document content in an associated first region-of-interest;
   determining a document map associated with said first input document and said second input document, wherein said document map defines said first region-of-interest in said first input document and said associated first region-of-interest in said second input document, wherein said document map comprises input document disassembly and reassembly configuration data for disassembling said input documents from student-specific input documents into component parts and reassembly of said component parts into question-specific reconfigured documents, wherein said document map comprises marking region data for locating a marking region in said reconfigured documents, wherein said document map also comprises region metadata associated with said regions of interest, said region metadata consisting of a recipient list of recipients to which said reconfigured documents are to be transmitted, recipient instructions, grading points assigned to each question and an explanation of the correct solution for each examination question, wherein said document map further comprises reconfigured document disassembly and reassembly data for disassembling said reconfigured documents with marking regions into reconfigured component parts and for reassembling said reconfigured component parts into modified documents, wherein said document map further comprises a modified document recipient list describing recipients to which said modified documents are to be transmitted;
   generating a first reconfigured document comprising the first document content in said first region-of-interest in said first input document and the second document content in said associated first region-of-interest in said second input document, wherein said generating is performed according to said input document reassembly configuration data in said document map;
   transmitting said first reconfigured document to a reconfigured document recipient identified in said document map;
   receiving a modified first reconfigured document at said computing device, wherein said modified first reconfigured document comprises grading modifications in a first marking region associated with said first region-of-interest and grading modifications in a second marking region associated with said associated first region-of-interest; and
   generating a first modified input document corresponding to said first input document and a second modified input document corresponding to said second input document, wherein said first modified input document comprises said modifications from said first marking region and said first document content from said first input document and said second modified input document comprises said modifications from said second marking region and said second document content from said second input document.

2. A method as described in claim 1, wherein said determining a document map comprises requesting said document map from a remote resource.

3. A method as described in claim 1, wherein said first input document is an examination document.

4. A method as described in claim 3, wherein said first region-of-interest corresponds to a first answer region in said examination document.

5. A method as described in claim 1, wherein said receiving is from an imaging device.

6. A method as described in claim 1 further comprising sending said first combined document to an imaging device.

7. A method as described in claim 1, wherein said first marking region is associated with a grading process related to an examination question associated with said first region-of-interest.

8. A method as described in claim 7 further comprising sending said first modified input document to an imaging device.

9. A method for imaging device remote document combination, said method comprising:
   receiving a document-combination request from a first imaging device;
   b) sending display content to said first imaging device, said display content comprising a list of available document combinations;
   receiving a document-combination selection from said first imaging device;
   receiving a first by-student input document comprising first document content and a second by-student input document comprising second document content from said first imaging device;
   determining a document map associated with said document-combination selection, wherein said document map comprises a first region-of-interest, wherein said document map comprises input document disassembly and reassembly configuration data for disassembling said input documents from by-student input documents into component parts and reassembly of said component parts into by-question reconfigured documents, wherein said document map comprises marking region data for locating a marking region in said reconfigured documents, wherein said document map also comprises region metadata associated with said regions of interest, said region metadata consisting of a recipient list of recipients to which said reconfigured documents are to be transmitted, recipient instructions, grading points assigned to each question and an explanation of the correct solution for each examination question, wherein said document map further comprises reconfigured document disassembly and reassembly data for disassembling said reconfigured documents with marking regions into reconfigured component parts and for reassembling said reconfigured component parts into modified documents, wherein said document map further comprises a modified document recipient list describing recipients to which said modified documents are to be transmitted;
   generating a first reconfigured by-question document comprising the document content in said first region-ofinterest from said first input document and from said second input document, wherein said generating is performed according to said input document reassembly configuration data in said document map;

transmitting said first reconfigured by-question document to a reconfigured document recipient identified in said document map;

receiving a modified first reconfigured document, wherein said modified first reconfigured document comprises a first marking region associated with said first input document and a second marking region associated with said second input document, wherein said marking regions are defined in said marking region data in said document map and wherein said first marking region comprises first modification data comprises second modification data input on said second modified reconfigured document; and generating a first modified input document corresponding to said first input document and a second modified input document corresponding to said second input document, wherein said first modified input document comprises the first modification data from said first marking region and the first document content from said first input document and said second modified input document comprises the second modification data from said second marking region and the second document content from said second input document.

10. A method as described in claim 9, wherein said first input document is an examination document.

11. A method as described in claim 9, wherein said first region-of-interest corresponds to a first answer region in an examination document associated with said first input document and said second input document.

12. A method as described in claim 9, wherein said determining a document map associated with said document-combination selection comprises requesting said document map from a remote resource.

13. A method as described in claim 9, wherein said display content is formatted in a markup language.

14. A method as described in claim 9 further comprising generating a second reconfigured document comprising third document content in a second region-of-interest from said first input document and said second input document, wherein said document map defines said second region-of-interest.

15. A method as described in claim 9 further comprising sending said first reconfigured document to a second imaging device.

16. A method as described in claim 15, wherein said first imaging device and said second imaging device are the same imaging device.

17. A method as described in claim 9, wherein said first marking region is associated with a grading process related to an examination question associated with said first region-of-interest.

18. A method as described in claim 17 further comprising sending said first modified input document to a third imaging device.

19. A method as described in claim 18, wherein said first imaging device and said third imaging device are the same imaging device.

20. A method for imaging device remote document combination, said method comprising:

receiving a document-combination request at an imaging device from a user interface on said imaging device;

sending said document-combination request from said imaging device to a remote computing device;

receiving said document-combination request from said imaging device at said remote computing device;

sending display content to said imaging device from said remote computing device, said display content comprising a list of available document combinations;

displaying said display content at said imaging device;

receiving a document-combination selection at said imaging device from said user interface on said imaging device;

sending said document-combination selection to said remote computing device from said imaging device;

receiving said document-combination selection at said remote computing device from said imaging device;

receiving a first input document comprising first document content in a first region-of-interest and a second input document comprising second document content in an associated first region-of-interest at said imaging device;

sending said first input document and said second input document from said imaging device to said remote computing device;

receiving, at said remote computing device from said imaging device said first input document and said second input document;

determining, at said remote computing device, a document map associated with said document-combination selection, wherein said document map defines said first region-of-interest and said associated first region-of-interest in said second input document, wherein said document map comprises input document disassembly and reassembly configuration data for disassembling said input documents from student-specific input documents and reassembly into question-specific reconfigured documents, wherein said document map comprises marking region data for locating a marking region in said reconfigured documents, wherein said document map also comprises region metadata associated with said regions of interest, said region metadata consisting of a recipient list of recipients to which said reconfigured documents are to be transmitted, recipient instructions, grading points assigned to each question and an explanation of the correct solution for each examination question, wherein said document map further comprises reconfigured document disassembly and reassembly data for disassembling said reconfigured documents with marking regions and for reassembling into modified documents, wherein said document map further comprises a modified document recipient list describing recipients to which said modified documents are to be transmitted;

generating, at said remote computing device, a first reconfigured document comprising the document content in said first region-of-interest from said first input document and from said second input document;

transmitting said first reconfigured document to a reconfigured document recipient identified in said document map;

receiving, at said remote computing device, a modified first reconfigured document, wherein said modified first reconfigured document comprises a first marking region associated with said first input document and a second marking region associated with said second input document, wherein said first marking region comprises first modification data input by a recipient of said first reconfigured document and said second marking region comprises second modification data input by said recipient; and generating, at said remote computing device, a first modified input document and a second modified input document, wherein said first modified input document comprises the first modification data from said first marking region and the document content in said first input document and said second modified input document comprises the second modification data from said second marking region and the document content in said second input document.

\* \* \* \* \*

UNITED STATES PATENT AND TRADEMARK OFFICE
CERTIFICATE OF CORRECTION

| | | |
|---|---|---|
| PATENT NO. | : 8,171,404 B2 | Page 1 of 1 |
| APPLICATION NO. | : 11/685046 | |
| DATED | : May 1, 2012 | |
| INVENTOR(S) | : Gregory Eugene Borchers et al. | |

It is certified that error appears in the above-identified patent and that said Letters Patent is hereby corrected as shown below:

Column 30, Line 31 should read:

sending display content to said first imaging device, said

Column 31, Line 15 should read:

comprises first modification data input on said first modified reconfigured document and said second marking region comprises second Signed and Sealed this
Eighth Day of January, 2013

David J. Kappos
*Director of the United States Patent and Trademark Office*